(12) United States Patent
Wakitani et al.

(10) Patent No.: US 7,343,994 B2
(45) Date of Patent: Mar. 18, 2008

(54) WORKING MACHINE

(75) Inventors: Tsutomu Wakitani, Wako (JP);
Norikazu Shimizu, Wako (JP);
Yoshihiko Yamagishi, Wako (JP);
Kenji Kuroiwa, Wako (JP)

(73) Assignee: Honda Motor Co., Ltd. (JP)

( * ) Notice: Subject to any disclaimer, the term of this patent is extended or adjusted under 35 U.S.C. 154(b) by 579 days.

(21) Appl. No.: 10/885,906

(22) Filed: Jul. 7, 2004

(65) Prior Publication Data
US 2005/0019173 A1    Jan. 27, 2005

(30) Foreign Application Priority Data
Jul. 22, 2003  (JP) ............... 2003-199910
Jul. 22, 2003  (JP) ............... 2003-199939
Jul. 22, 2003  (JP) ............... 2003-199959
Jul. 22, 2003  (JP) ............... 2003-200003

(51) Int. Cl.
*B60K 6/08* (2006.01)
(52) U.S. Cl. ............... 180/65.4; 37/246; 903/925
(58) Field of Classification Search ............... 180/65.4; 37/246; 903/925
See application file for complete search history.

(56) References Cited

U.S. PATENT DOCUMENTS

| 5,212,431 | A | * | 5/1993 | Origuchi et al. ............ 318/139 |
| 5,515,937 | A | * | 5/1996 | Adler et al. ............... 180/65.2 |
| 5,588,498 | A | * | 12/1996 | Kitada ...................... 180/65.4 |
| 5,786,640 | A | * | 7/1998 | Sakai et al. .................... 290/17 |
| 5,806,617 | A | * | 9/1998 | Yamaguchi ............... 180/65.2 |
| 6,453,583 | B1 | | 9/2002 | Hanafusa et al. ............ 37/246 |
| 6,480,767 | B2 | * | 11/2002 | Yamaguchi et al. .......... 701/22 |
| 6,484,833 | B1 | * | 11/2002 | Chhaya et al. ............. 180/65.4 |
| 6,622,804 | B2 | * | 9/2003 | Schmitz et al. ............ 180/65.2 |
| 6,708,789 | B1 | * | 3/2004 | Albuquerque De Souza E Silva ...................... 180/65.2 |
| 6,799,650 | B2 | * | 10/2004 | Komiyama et al. ........ 180/65.2 |
| 7,134,516 | B2 | * | 11/2006 | Eisenhardt et al. ........ 180/65.2 |

(Continued)

FOREIGN PATENT DOCUMENTS

DE            4116899            11/1991

(Continued)

*Primary Examiner*—Christopher P. Ellis
*Assistant Examiner*—John D Walters
(74) *Attorney, Agent, or Firm*—Adams & Wilks

(57) ABSTRACT

A working machine has a machine body, a working unit attached to the machine body, an internal combustion engine for driving the working unit, a traveling unit mounted on the machine body 11 for displacing the working unit over a ground surface to perform a work operation on the ground surface, and an electric motor for driving the traveling unit. A battery supplies electric power to the electric motor in a battery mode of the working machine to thereby drive the electric motor. A battery mode switch switches between an ON position in which the working machine is in the battery mode and an OFF position in which the working machine is not in the battery mode. A power generator is driven by the internal combustion engine to supply electric power to the battery and to the electric motor. A control unit controls rotation of the electric motor and shifts the working machine to the battery mode in accordance with an ON position of the battery mode switch so that the electric motor is driven only by electric power supplied by the battery while the internal combustion engine is maintained deactivated.

16 Claims, 20 Drawing Sheets

U.S. PATENT DOCUMENTS

2004/0112652 A1* 6/2004 Esposito et al. ........... 180/65.2

FOREIGN PATENT DOCUMENTS

| DE | 4133013 | 4/1993 |
| --- | --- | --- |
| DE | 4422636 | 1/1996 |
| JP | 07075210 | 3/1995 |
| JP | 01271317 | 10/2001 |
| JP | 2002235572 | 8/2002 |
| JP | 2003200761 | 7/2003 |

* cited by examiner

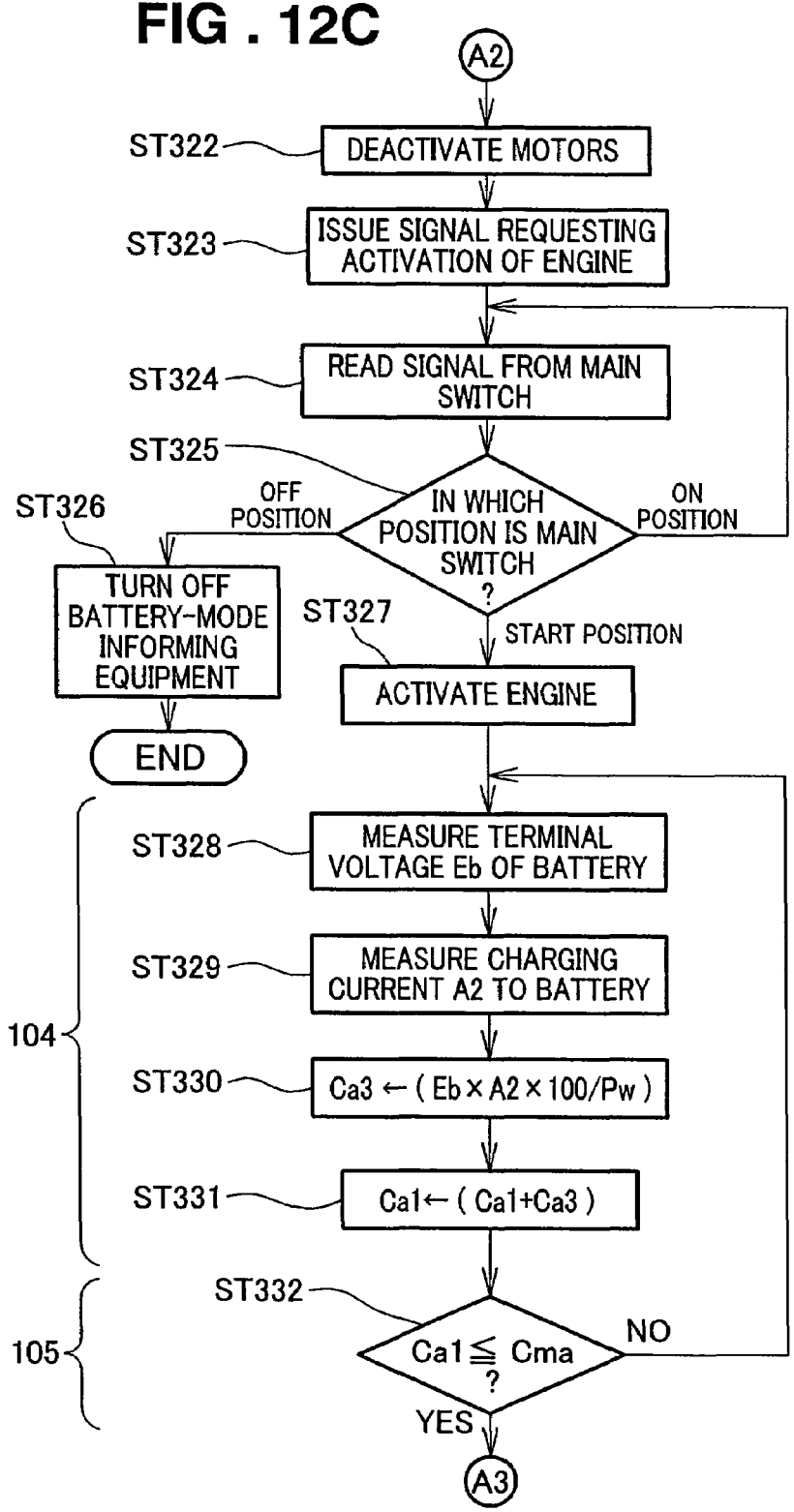

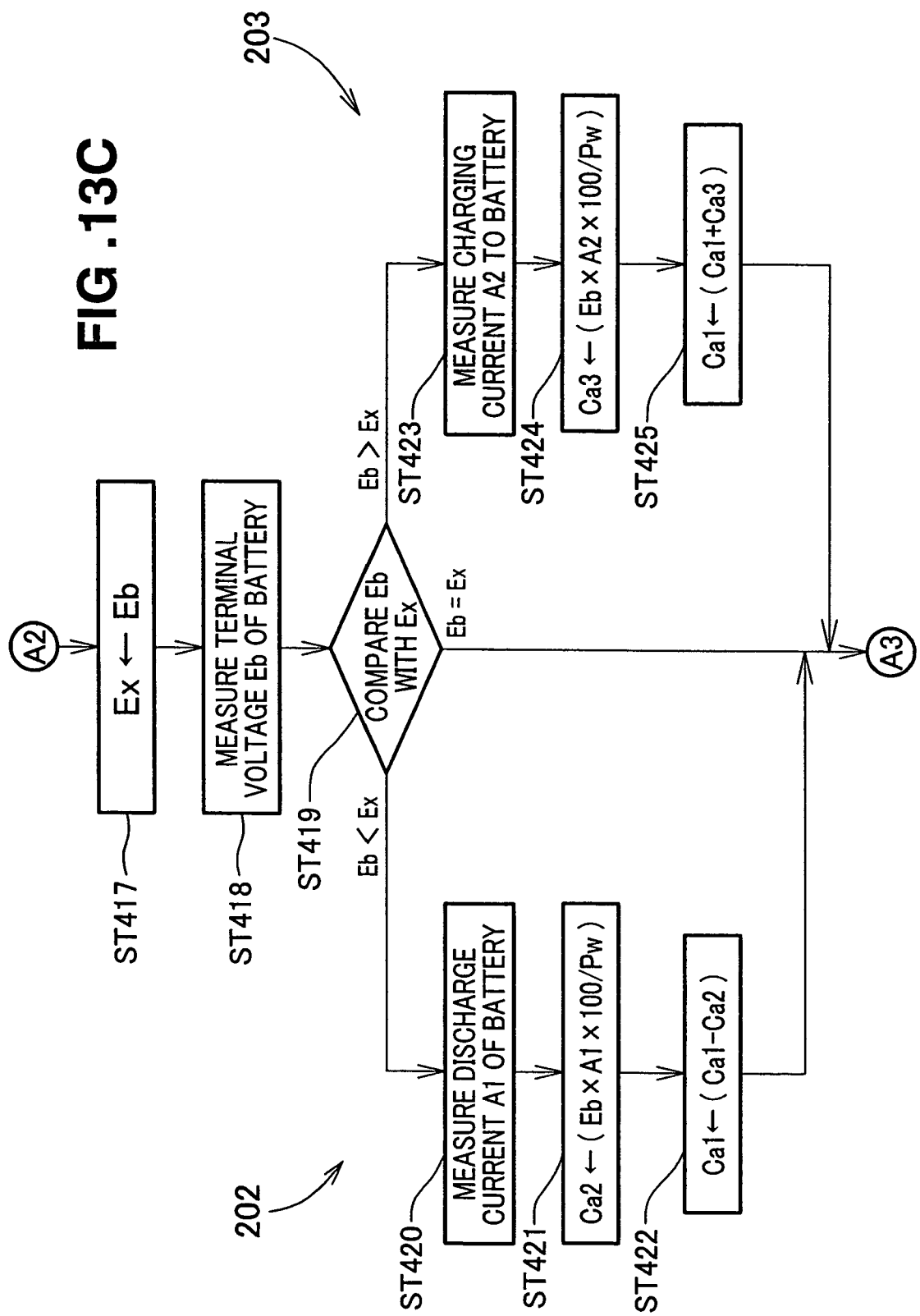

US 7,343,994 B2

WORKING MACHINE

FIELD OF THE INVENTION

The present invention relates to an improvement in working machines of a type using both an internal combustion engine and electric motor as drive sources.

BACKGROUND OF THE INVENTION

Working machines of the type where an internal combustion engine drives a working unit and an electric motor drives traveling units are known, for example, from Japanese Patent Application Laid-open Publication No. 2001-271317. The conventional working machine disclosed in the No. 2001-271317 publication will be outlined below with reference to FIG. 14.

In FIG. 14, the working machine 300 is constructed as a snow plow or snow removing machine including a machine body 301, on which are provided: a working unit 304 including an auger 302 and blower 303; an engine 305 for driving the working unit 304; left and right traveling units 306 each including a crawler; left and right motors 307 for driving the traveling units 306; a power generator 309 driven by the engine 305 for supplying electric power to a battery 308 and motors 307; and a control 311 for controlling the motors 307 etc. The power generator 309 is driven by a portion of the output of the engine 305, and electric power thus produced by the generator 309 is supplied to the battery 308 and motors 307. The remaining portion of the output of the engine 305 is supplied via an electromagnetic clutch 312 to the working unit 304 for rotation of the working unit 304. In this way, the working machine 300, constructed as a snow removing machine, drives the working unit 304 via the engine 305 and drives the traveling units 306 via the motors 307.

Because the working unit 304 and traveling units 306 are driven via the engine 305 and motors 307, respectively, the battery 308 is often of a relatively small capacity and small size; the battery 308 need not have a large capacity since electric power can be constantly supplied by the generator 309 driven by the engine 305. Namely, it is only necessary for the generator 309 to generate an amount of electric power slightly greater than that consumed by the motors 307.

With such a working machine 300, a user or human operator sometimes wants to cause the machine 300 to temporarily travel a short distance with the engine 305 kept deactivated, such as when the machine 300 is to be moved in or out of a storage space or transferred from the storage space to a nearby working place. It would be very cumbersome to activate the engine 305 on each of such occasions. Further, since the motors 307 are driven only by the power supplied from the small-capacity battery 308, a great amount of electric power would be consumed from the battery 308. Therefore, the working machine 300 can travel for only a limited time, and a further improvement has to be made in this respect. Further, if the remaining capacity of the battery 308 is reduced excessively, then the engine 305 can not be activated by the power supplied from the battery 308; besides, the battery 308 can not be charged appropriately by driving of the engine 305. In addition, the over-discharge of the battery 308 would adversely influence the performance and life of the battery, and a further improvement has to be made in this respect too.

SUMMARY OF THE INVENTION

In view of the foregoing prior art problems, it is an object of the present invention to provide an improved working machine of the type using both an internal combustion engine and electric motor as its drive sources, which is capable of being temporarily transferred only a short distance only via the motor without the engine being activated, which can travel for a maximized time when the engine is at rest, and which can reliably prevent over-discharge of a battery.

In order to accomplish the above-mentioned object, the present invention provides an improved working machine employing both an internal combustion engine and an electric motor, which comprises: a machine body; a working unit attached to the machine body; the internal combustion engine for driving the working unit; a traveling unit comprising a crawler or traveling wheel for causing the machine to travel as instructed by a human operator; the electric motor for driving the traveling unit; a power generator drivable by the internal combustion engine to supply electric power to a battery and the electric motor; and a control unit for controlling rotation of the electric motor. In the working machine of the present invention, the control unit performs control to shift an operation mode of the working apparatus to a battery mode so that the electric motor is rotated by only the electric power supplied by the battery with the internal combustion engine kept at rest or deactivated.

In the working machine arranged in the above-identified manner, shifting the operation mode to the battery mode allows the electric motor to be rotated by only the power supplied from the battery with the internal combustion engine kept deactivated. Therefore, the working machine can be driven, by activation of only the electric motor, to travel temporarily only a short distance without the internal combustion engine being activated; thus, it is possible to eliminate a need for operating the internal combustion engine. Since it suffices to operate the electric motor alone, overall operation of the working machine can be significantly simplified, which can thereby achieve an enhanced handling ease of the working machine. Further, because the internal combustion engine does not have to be operated more than necessary, the present invention can not only increase the life of the engine, but also effectively reduce consumption of fuel etc. required for operating the engine.

Preferably, the control unit measures a terminal voltage of the battery immediately after a shift to the battery mode, determines a current remaining capacity of the battery on the basis of the measured terminal voltage, then determines a travel-permitting capacity of the battery by subtracting, from the remaining capacity, a minimum remaining capacity of the battery necessary to activate the internal combustion engine at least once, then determines a maximum available travel time on the basis of the travel-permitting capacity, and then performs control to allow the electric motor to be rotated for the maximum available travel time.

Thus, even when the power consumption from the battery has progressed considerably as only the motor is driven with the internal combustion engine kept deactivated, the motor can be rotated for any desired time as long as the minimum remaining capacity, necessary to activate the engine at least once, remains unconsumed. Namely, when only the motor is being driven, the maximum available travel time of the machine is limited, so that the engine can be reliably activated whenever necessary despite reduction in the remaining capacity of the battery. Therefore, the engine can be reliably re-driven to resume desired work promptly, and thus the handling ease of the working machine can be further enhanced. Further, by preventing over-discharge of the battery in the above-described manner, the present invention can further enhance the life of the battery.

In a preferred implementation, the control unit sets target acceleration and target maximum traveling speed of the traveling unit to be applied when the electric motor is rotated by only the electric power supplied by the battery with the internal combustion engine kept deactivated, to respective given values smaller than values of the target acceleration and target maximum traveling speed of the traveling unit to be applied when the internal combustion engine is driven to rotate the electric motor. On the basis of the smaller values of the target acceleration and target maximum traveling speed, the control unit controls the rotation of the electric motor effected by only the electric power supplied by the battery with the internal combustion engine kept deactivated. Therefore, the present invention can lower a rate of the electric power consumption from the battery, thereby increasing the maximum available travel time when the internal combustion engine is kept at rest.

Preferably, the control unit presets a lower limit of the remaining capacity of the battery necessary to activate the internal combustion engine at least once. The control unit constantly measures the remaining capacity of the battery in the battery mode, and, when the measured remaining capacity has decreased to the lower limit during execution of the battery mode, the control unit performs control to deactivate the electric motor and issue, to predetermined informing equipment, such as a visual display and/or sound generator, a signal requesting activation of the internal combustion engine. Because the electric motor is deactivated with the minimum remaining capacity of the battery, necessary to activate the internal combustion engine at least once, left unconsumed, the present invention can reliably avoid the over-discharge of the battery. Therefore, even when the measured remaining capacity of the battery has decreased considerably, the engine can be reliably re-driven to resume the desired work promptly, and thus the handling ease of the working machine can be further enhanced. Further, with the arrangement that the informing equipment prompts the human operator to activate the internal combustion engine when the measured remaining capacity of the battery has decreased to the lower limit of the remaining capacity necessary to activate the internal combustion engine at least once, the human operator can activate the engine, in response to information by the informing equipment, to drive the power generator so as to charge the battery, even during execution of the battery mode. Namely, the human operator can activate the internal combustion engine to charge the battery as desired (or of his or her volition), so that controllability and handling ease of the working machine in the battery mode can be even further enhanced.

Further, in the battery mode, the control unit may constantly measure the remaining capacity of the battery while the internal combustion engine is driving the power generator to charge the battery. When the measured remaining capacity has increased to a preset upper limit during execution of the battery mode, the control unit may perform control to issue, to the informing equipment, a signal requesting deactivation of the internal combustion engine. Thus, the human operator can terminate the charging of the battery by deactivating the internal combustion engine in response to predetermined information by the informing equipment. After that, the human operator may re-activate only the motor to cause the working machine to temporarily travel a short distance. Because the human operator can activate the internal combustion engine to charge the battery as desired (or of his or her volition) in this manner, the present invention can not only even further enhance the controllability and handling ease of the working machine in the battery mode, but also avoid the over-discharge of the battery.

Preferably, the control unit presets the lower limit of the remaining capacity of the battery necessary to activate the internal combustion engine at least once, and constantly measures the remaining capacity of the battery in the battery mode. When the measured remaining capacity has decreased to the lower limit during execution of the battery mode, the control unit performs control to activate the internal combustion engine to thereby drive the power generator so that the battery is charged by the electric power generated by the power generator. Namely, when the measured remaining capacity has decreased to the lower limit of the remaining capacity of the battery necessary to activate the internal combustion engine at least once, the internal combustion engine is automatically activated to charge the battery via the power generator. Thus, even after the lower limit of the remaining capacity has been reached, the motor can continue to operate and the over-discharge of the battery can be prevented, which would require no cumbersome operation, such as one for "first activating the engine after temporary deactivation of the motor and then re-activating the motor.

Preferably, in the battery mode, the control unit constantly measures the remaining capacity of the battery and controls opening of a throttle value to adjust a number of rotations of the internal combustion engine in accordance with the measured remaining capacity while the internal combustion engine is driving the power generator to charge the battery. When the measured remaining capacity has increased to a preset upper limit during execution of the battery mode, the control unit performs control to deactivate the internal combustion engine. Namely, when the internal combustion engine is driving the power generator to charge the battery in the battery mode, the opening of the throttle valve can be controlled constantly in accordance with the constantly-measured remaining capacity. Amount of fuel supply to the internal combustion engine can be controlled in accordance with the opening of the throttle valve, and thus the number of rotations of the internal combustion engine can be controlled in accordance with the measured remaining capacity. As a consequence, the internal combustion engine is allowed to constantly operate under optimal conditions in accordance with the current charged state of the battery. For example, irrespective of operating conditions, such as load intensity, of the motor, the battery can be charged efficiently by operating the internal combustion engine in such a manner that the amount of the charge from the power generator to the battery always exceeds the amount of the discharge (power consumption) from the battery to the motor.

Further, when the remaining capacity of the battery has increased to the upper limit during the charge to the battery in the battery mode, the charge to the battery is terminated by the control unit automatically deactivating the engine. Namely, during execution of the battery mode, the engine is automatically caused to operate temporarily for a short time only when the remaining capacity of the battery has decreased considerably. In addition, the motor is allowed to operate continuously for a relatively long time irrespective of the remaining capacity of the battery, while the engine is caused to operate in an intermittent manner. Therefore, the controllability and handling ease of the machine in the battery mode can be even further enhanced. Besides, the over-discharge of the battery can be avoided reliably.

BRIEF DESCRIPTION OF THE DRAWINGS

Certain preferred embodiments of the present invention will hereinafter be described in detail, by way of example only, with reference to the accompanying drawings, in which:

FIGS. 12A-12D are a flow chart showing a third embodiment of control performed by the control unit;

FIGS. 13A-13E are a flow chart showing a fourth embodiment of control performed by the control unit.

DETAILED DESCRIPTION OF THE PREFERRED EMBODIMENTS

The working machine of the present invention will be described below as embodied as a snow plow or snow removing machine. It should be noted that the terms "front", "rear", "left", "right", "upper", "lower", etc. represent various directions as viewed by a human operator operating the working machine.

Figure 1:
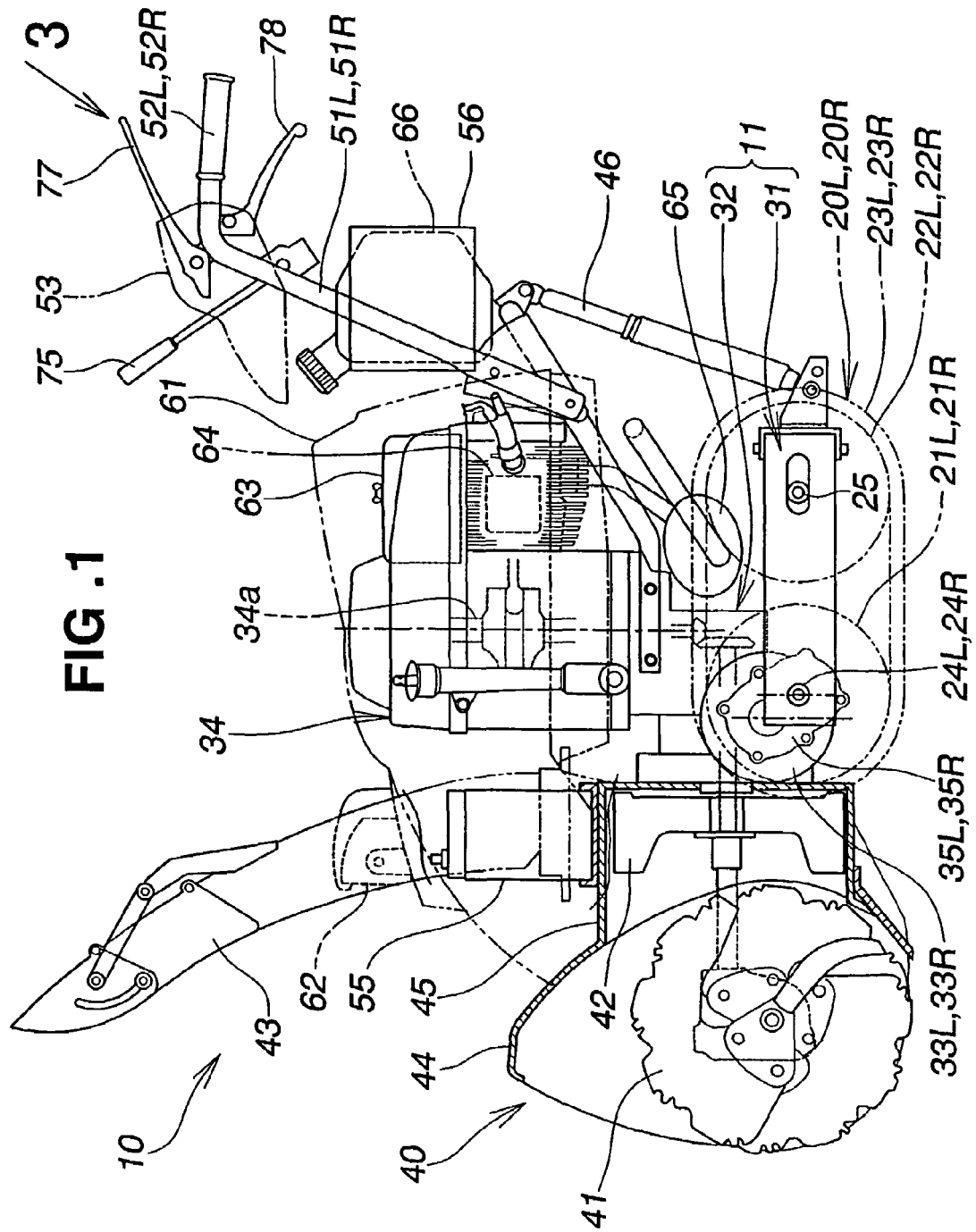
FIG. 1 is a side view of a snow removing machine in accordance with a preferred embodiment of the present invention.
Figure 2:
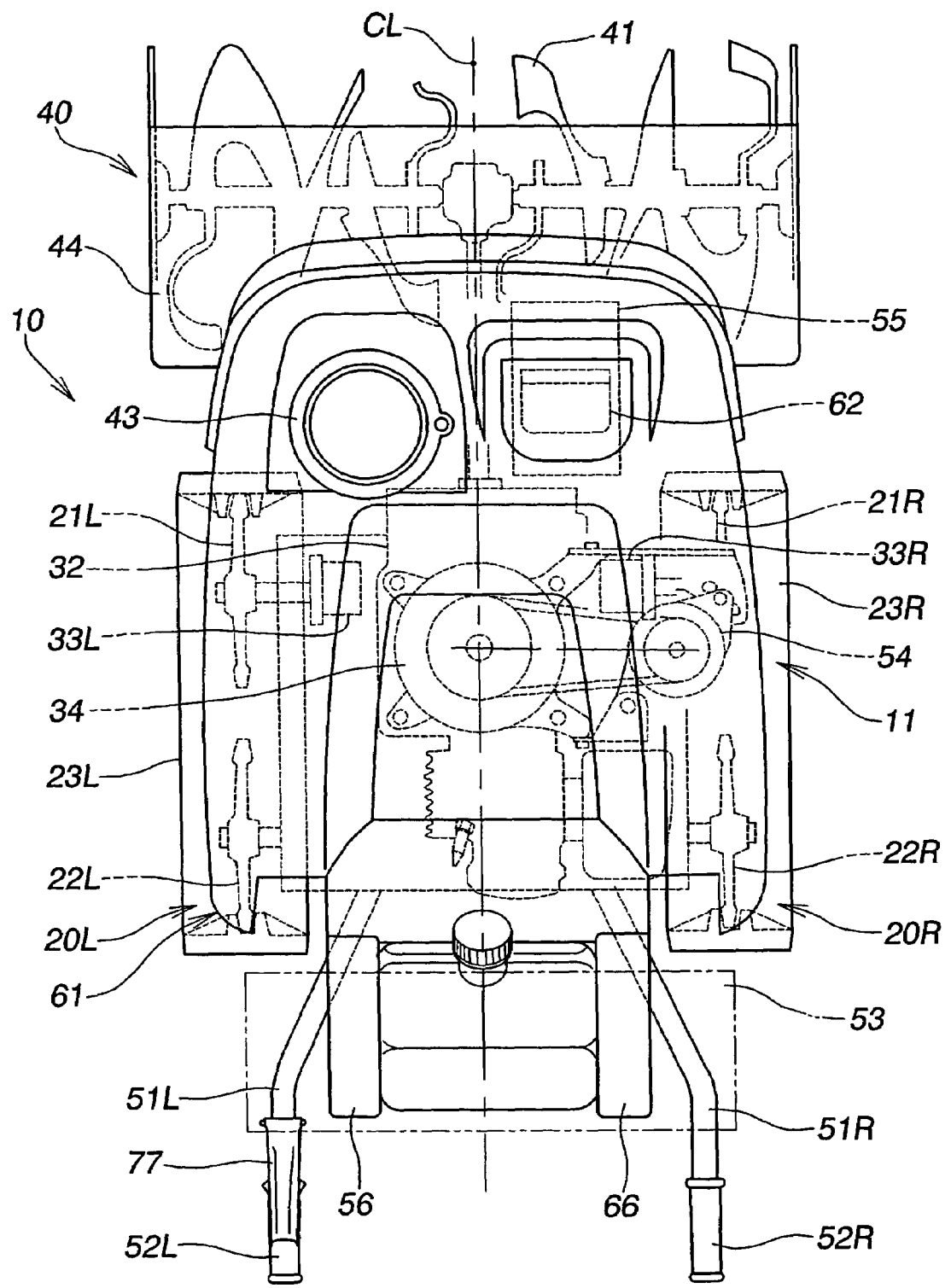
FIG. 2 is a top plan view of the snow removing machine of FIG. 1.

As illustrated in FIGS. 1 and 2, the snow removing machine 10, constructed as an embodiment of the present invention, includes a machine body 11 composed of a traveling unit frame 31 and transmission case 32.

The traveling unit frame 31 has left and right traveling units 20L and 20R mounted thereon. The transmission case 32 is connected to the traveling unit frame 31 for vertical pivotal movement thereto. Left and right motors 33L and 33R are secured to left and right sides of the transmission case 32, and an engine (internal combustion engine) 34 are mounted on an upper portion of the transmission case 32. Snow removing working unit 40 is attached to a front portion of the transmission case 32. Left and right operating handles 51L and 51R extend rearwardly and upwardly from an upper portion of the transmission case 32, and a control or operation panel 53 is disposed between the left and right operating handles 51L and 51R.

The snow removing machine 10 is a self-propelled, walk-behind type working machine where a human operator walks behind the operation panel 53 while holding grips 52L and 52R provided at the respective distal ends of the left and right operating handles 51L and 51R.

In the working machine 10 of the present invention, the engine 34 drives the snow removing working unit 40 and the left and right motors 33L and 33R only drive the left and right traveling units 20L and 20R. The working machine 10 is so arranged on the basis of the idea that the electric motor is suited for traveling speed control, turning movement control and forward/rearward travel switching control while the more powerful internal combustion engine is suited for driving of a working section that is subject to rapid load variation.

The left and right motors 33L and 33R are travel drive sources for driving the left and right traveling units 20L and 20R via left and right transmission mechanisms 35L and 35R.

The left traveling unit 20L is in the form of a crawler including a crawler belt 23L wound on a front driving wheel 21L and rear idling wheel 22L, where the driving wheel 21L is rotated via the left motor 33L in forward and reverse directions. The right traveling unit 20R is also in the form of a crawler including a crawler belt 23R wound on a front driving wheel 21R and rear idling wheel 22R, where the driving wheel 21R is rotated via the right motor 33R in forward and reverse directions.

The traveling unit frame 31 rotatably supports left and right driving wheel axles 24L and 24R on its front portion and an idling wheel axle 25 on its rear portion. The left and right driving wheel axles 24L and 24R are rotational shafts on which are fixedly mounted the left and right driving shafts 21L and 21R. The left and right driving wheels 21L and 21R are rotatably mounted on the idling wheel axle 25.

The engine 34, which is in the form of a vertical engine having a crankshaft 34a extending downward, constitutes a work drive source for supplying power to the snow removing working unit 40 via a work power transmission mechanism accommodated in the transmission case 32.

The snow removing working unit 40 includes a front auger 41, a rear blower 42, an upper shooter 43, an auger housing 144 covering the auger 41, and a blower housing 45 covering the blower 42. The auger 41 gathers snow, piled up on the ground, toward the center of the machine 10, and the blower 42 receives and throws the gathered snow to desired positions around the machine 10 through the shooter 43.

Pivot drive mechanism 46 causes the transmission case 32 and snow removing working unit 40 to pivot vertically so as to adjust an orientation or posture of the auger housing 44.

As seen in FIG. 2, the machine body 11 has a power generator 54 and a battery 55 mounted on its front portion.

Namely, on the machine body 11 of the snow removing machine 10, there are provided: the working unit 40, such as the snow removing unit; internal combustion engine 34 for driving the snow removing machine 10; traveling units 20L and 20R including the crawlers and wheels; electric motors 33L and 33R for driving the traveling units 20L and 20R; power generator 54 driven by the engine 34 for supplying electric power to the battery 55 and motors 33L and 33R; and a control unit (hereinafter sometimes referred to as a "control") 56 for controlling the motors 33L and 33R. The control unit 56 is disposed, for example, under or within the operation panel 53.

In the figure, reference numeral 61 represents a cover covering the engine 34 and other components around the engine 34, 62 a lamp, 63 an air cleaner, 64 a carburetor, 65 an engine exhaust muffler, and 66 a fuel tank.

Figure 3:
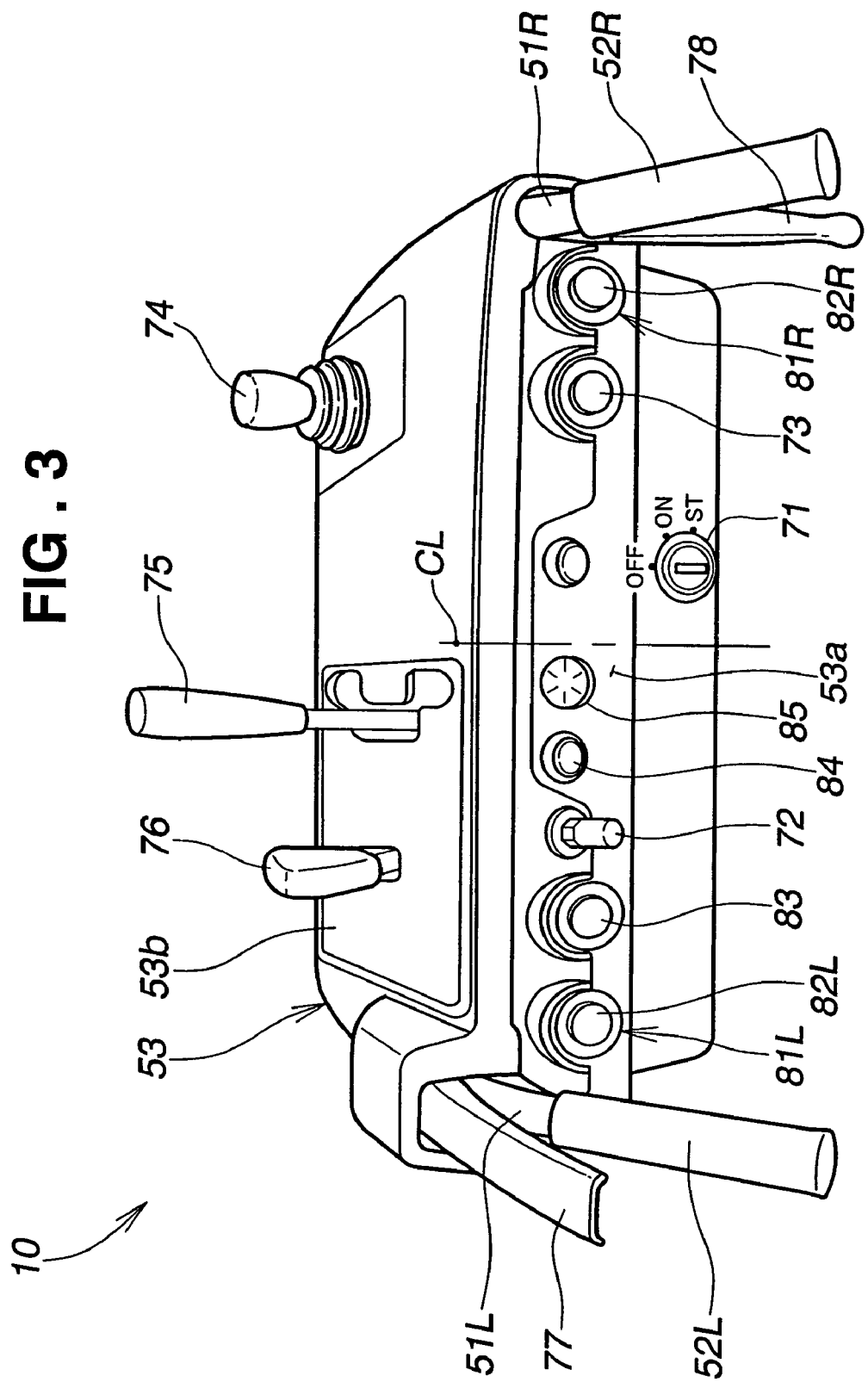
FIG. 3 is a view of the snow removing machine taken in a direction of arrow "3" of FIG. 1.

As illustrated in FIG. 3, the operation panel 53 includes, on its rear or operator-side surface 53a i.e., surface facing the human operator), a main switch 71, an engine choke 72, a clutch operating switch 73, etc. On an upper surface 53b of the operation panel 53, there are provided, from right to left, a snow-throwing-direction adjusting lever 74, a direction/speed control lever 75 for the traveling units, and an engine throttle lever 76. Further, the left grip 52L and right grip 52R are located to the left and right of the operation panel 53.

The left operating handle 51L also includes a travel preparation lever 77 near the grip 52L, while the right operating handle 51R also includes an auger-housing-posture adjusting lever 78 near the grip 52R.

In FIGS. 1 and 3, the main switch 71 is a conventionally-known ignition switch, and the human operator can activate the engine 34 by inserting a main key in a key hole of the switch 71 and turning the inserted main key. For example, an "OFF" position, "ON" position and "ST" (start) position are set sequentially in a clockwise direction around the key hole in the order mentioned.

Setting the main key to the "OFF" position can not only deactivate the engine 34 but also turn off all electric systems in the machine 10. Shifting the main key from the "OFF" position to the "ON" position can deactivate the engine 34. Setting the main key to the "ST"(start) position can activate the engine 34. Further, shifting the main key from the "ST" (start) position to the "ON" position can cause the activated engine 34 to change over directly to its full-scale operation.

The engine choke 72 is an operating member that can be pulled by the human operator to increase the concentration of an air-fuel mixture. The clutch operating switch 73 is a push button switch for turning on/off the auger 41 and blower 42.

The snow-throwing-direction adjusting lever 74 is a lever operable to change an operating orientation of the shooter 43. The direction/speed control lever 75 is a forward/rearward traveling speed adjusting lever operable to not only adjust the rotating speed of the motors 33L and 33R but also switch between forward and reverse rotating directions of the motors 33L and 33R to thereby switch between forward and rearward traveling directions of the machine 10.

Figure 4:
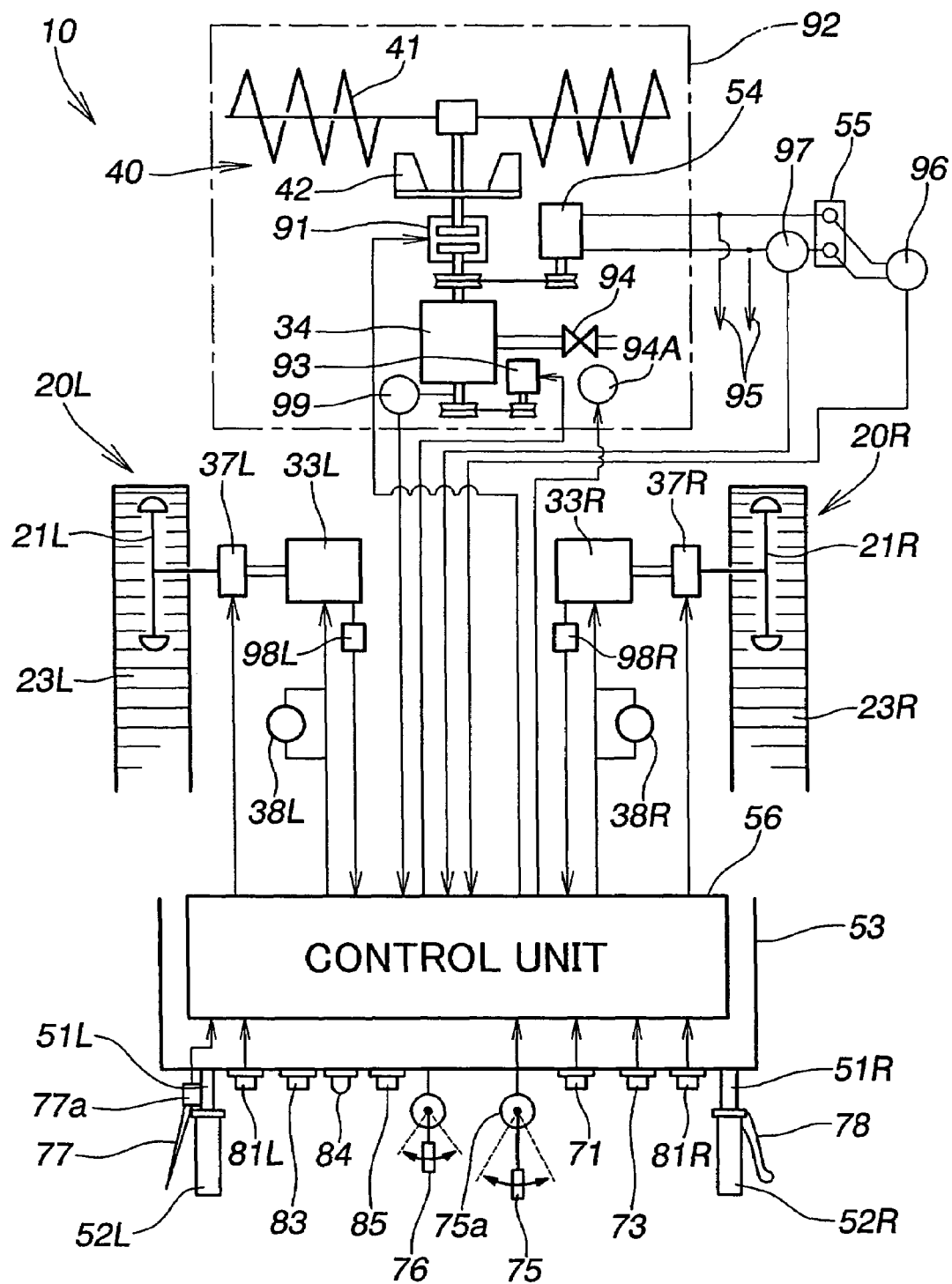
FIG. 4 is a control block diagram of the snow removing machine of the invention.

The engine throttle lever 76 is a lever for controlling the number of rotations of the engine 34 by adjusting the opening of a throttle valve (94 in FIG. 4).

The travel preparation lever 77 is an operating member acting on a switch 77a (FIG. 4); the switch 77a is turned on when the lever 77 is brought to a free position by pulling operation of a return spring. When the human operator uses his or her left hand to hold and depress the travel preparation lever 77 toward the grip 52L, the switch 77a is turned off. Whether or not the travel preparation lever 77 is being held by the human operator is detectable on the basis of the ON/OFF state of the switch 77a.

The auger-housing-posture adjusting lever 78 is a lever operable by the human operator when the posture of the auger housing 44 is to be changed through operation of the pivot drive mechanism 46.

The operation panel 53 also includes left and right turning operation switches 81L and 81R between the left and right operating handles 51L and 51R and within a range where the human operator can manipulate the turning operation switches 81L and 81R with the hands holding the operating handles 51L and 51R.

The left turning operation switch 81L is a push button switch including a push button 82L oriented toward the rear of the snow removing machine 10 i.e., toward the human operator). The left turning operation switch 81L is an automatically-reset switch that is kept ON to generate a predetermined switch signal only while the push button 82L is being depressed by the human operator.

Similarly, the right turning operation switch 81R is a push button switch including a push button 82R oriented toward the rear of the snow removing machine 10. The right turning operation switch 81R is an automatically-reset switch that is kept ON to generate a predetermined switch signal only while the push button 82R is being depressed by the human operator.

Specifically, the left turning operation switch 81L and its push button 82L are provided on the operator-side surface 53a of the operation panel 53 inwardly of the left grip 52L (namely, located closer than the grip 52L to an imaginary longitudinal centerline CL extending lengthwise of the machine 10, i.e., centrally of the width of the vehicle). Similarly, the right turning operation switch 81R and its push button 82R are provided on the operator-side surface 53a of the operation panel 53 inwardly of the right grip 52R (namely, located closer than the grip 52R to the imaginary longitudinal centerline CL extending lengthwise of the machine 10.

When the human operator grips the left and right operating handles 51L and 51R with his or her both hands, the thumb of each of the hands is generally located between the handles 51L and 51R, i.e., the thumb nail faces toward the imaginary longitudinal centerline CL.

The snow removing machine 10 can be turned left only when the human operator is depressing the push button 82L of the left turning operation switch 81L with the thumb of the left hand while gripping and manipulating the left and right operating handles 51L and 51R. Similarly, the snow removing machine 10 can be turned right only when the human operator is depressing the push button 82R of the right turning operation switch 81R with the thumb of the right hand. In this way, the human operator can perform desired turning operation with utmost ease without releasing or letting go of any of the handles 51L, 51R.

Because the left and right turning operation switches 81L and 81R, intended to manipulate electromagnetic brakes (37L and 37R in FIG. 4) functioning as a turning mechanism, are provided on the operation panel 53 between the operating handles 51L and 51R and within the range operable with the hands of the human operator gripping the handles 51L and 51R, the operator can operate any desired one of the operation switches 81L and 81R with the thumb of one of the hands gripping and manipulating the handles 51L and 51R. As a consequence, it is not necessary for the human operator to let go of and re-grip any of the handles 51L, 51R, which can thereby enhance the controllability of the snow removing machine 10.

Further, on the operator-side surface 53a of the operation panel 53, there are provided a battery mode switch 83 and informing equipment that includes a informing display 84 and informing sound generator 85.

The battery mode switch 83 is an automatically-reset push button switch that is kept ON to generate a predetermined switch signal only when the human operator is depressing the switch 83.

The informing display 84, which comprises, for example, a display panel like a liquid crystal display panel or a display lamp, visually displays information on the basis of an instruction signal given from the control 56. The informing sound generator 85 generates informing sounds on the basis of an instruction signal given from the control 56, and it comprises, for example, an informing buzzer or other type of sound generating device.

FIG. 4 is a control block diagram of the snow removing machine 10. The engine 34, electromagnetic clutch 91, auger 41 and blower 42 together constitute a working system 92, and the remaining components constitute a travel system First, behavior of the snow removing working unit 40 will be described.

Starter 93 and engine 34 are activated by the human operator inserting the key in the main switch 71 and turning the inserted key to the "ST" (start) position ST of FIG. 3. The engine throttle lever 76 controls the number of rotations of the engine 34 by adjusting the opening of the throttle valve 94 via a not-shown throttle wire.

The opening of the throttle valve 94 is controlled by a valve drive section 94A in accordance with a control signal given from the control unit 56.

When the engine 34 should operate in a battery mode to be later described, the valve drive section 94A is driven on the basis of a signal given from the control unit 56.

The power generator 54 is driven by a portion of the output of the engine 34, and electric power thus produced by the generator 54 is supplied to the battery 55 and motors 33L and 33R. The remaining portion of the output of the engine 34 is supplied via the electromagnetic clutch 91 to the auger 41 and blower 42 for rotation thereof. The power generator 54 and battery 55 supply, via a wiring harness 95, electric power to the left and right motors 33L and 33R and other electric equipment of the machine 10.

Voltage sensor 96 detects a voltage between two terminals of the battery 55 (open-circuit voltage). Current sensor 97 detects a charge current and discharge current. Reference numerals 98L and 98R represent sensors for detecting the respective numbers of rotations (rotating speeds) of the left and right electric motors 33L and 33R. 99 represents a sensor for detecting the number of rotations (rotating speed) of the engine 34.

Once the human operator activates the clutch operating switch 73 while griping the travel preparation lever 77, the electromagnetic clutch 91 is brought to a connecting state so that the auger 41 and blower 42 are driven to rotate by the power of the engine 34. The electromagnetic clutch 91 is brought back to a disconnecting state if the human operator shifts the travel preparation lever 77 to the free position or again depresses the clutch operating switch 73.

Next, behavior of the traveling units 20L and 20R will be described.

The snow removing machine 10 includes the left and right electromagnetic brakes 37L and 37R that function like parking brakes of vehicles. Specifically, the respective rotation shafts of the left and right motors 33L and 33R are braked by the electromagnetic brakes 37L and 37R. During parking of the machine 10, the electromagnetic brakes 37L and 37R are in a braking state under control of the control unit 56; the electromagnetic brakes 37L and 37R can be shifted to a non-braking state in the following manner.

Namely, the electromagnetic brakes 37L and 37R are shifted to the non-braking (or open) state once the direction/speed control lever 75 is shifted to a forward or rearward travel position while 1) the main switch 71 is in the "ST" (start) or "ON" position and 2) the travel preparation lever 77 is being gripped by the human operator. When the snow removing machine 10 is to be turned left, the left electromagnetic brake 37L is activated, while, when the snow removing machine 10 is to be turned right, the right electromagnetic brake 37R is activated.

Figure 5:
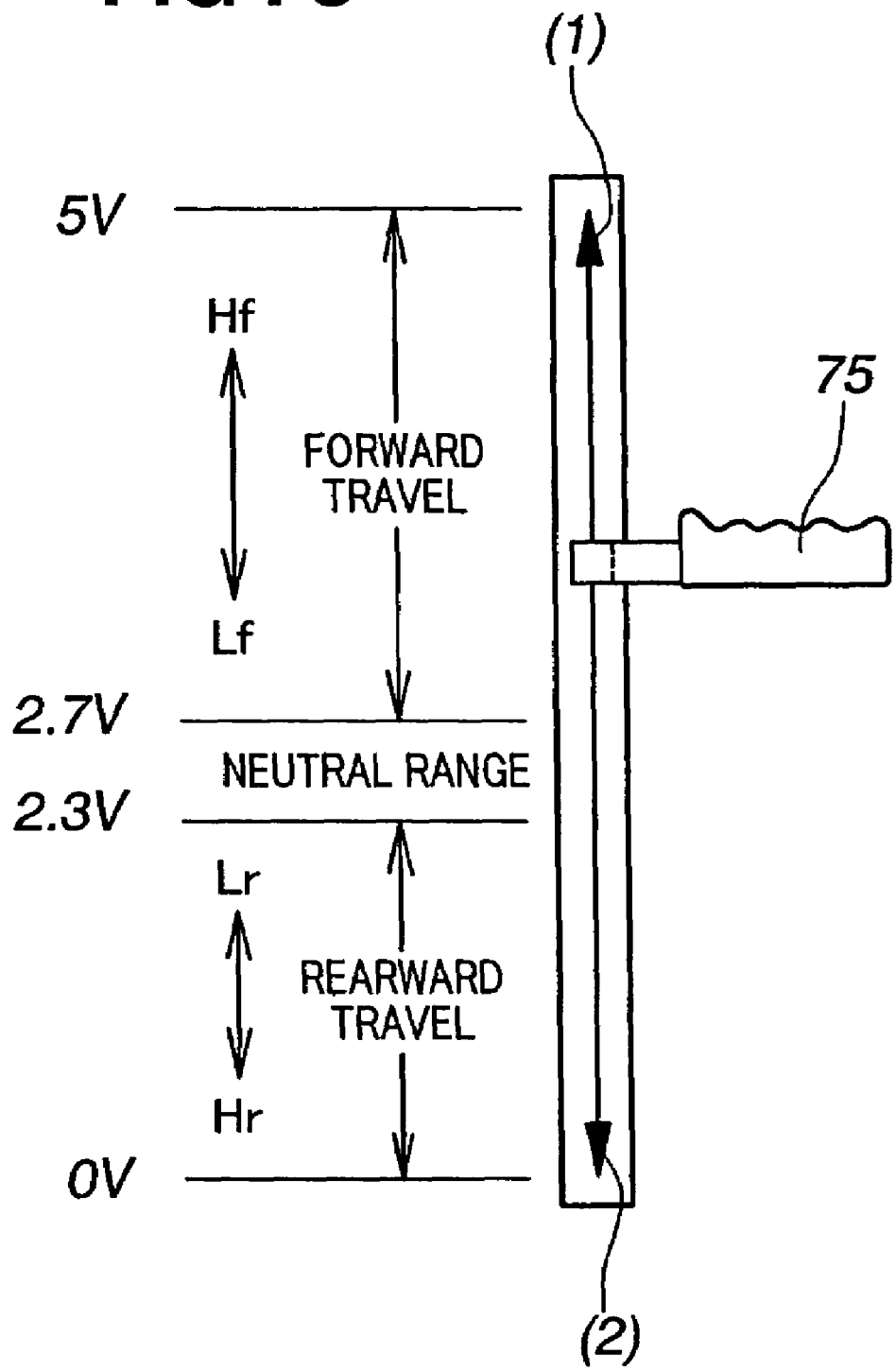
FIG. 5 is a schematic view showing a direction/speed lever employed in the snow removing machine of the invention.

As seen in FIG. 5, the direction/speed control lever 75 is reciprocatively movable in opposite directions as indicated by arrows (1) and (2). If the direction/speed control lever 75 is shifted or turned from a "neutral range" to a "forward travel" range, the vehicle moves forward. In the "forward travel" range, the machine is variable in speed between a low speed Lf and a high speed Hf. Similarly, if the direction/speed control lever 75 is shifted or turned from the "neutral range" to a "rearward travel" range, the vehicle moves rearward. In the "rearward traver" range, the machine is variable in speed between a low speed Lr and a high speed Hr.

Thus, in the "forward travel" and "rearward travel" range, target acceleration, target deceleration and target maximum traveling speed can be set for each of the traveling units 20L and 20R.

In the illustrated example of FIG. 5, voltages corresponding to the various positions of the direction/speed control lever 75 are generated via a potentiometer 75a in such a manner that 0 V corresponds to the target maximum speed of rearward travel, 2.2 V corresponds to the target low speed of rearward travel, 2.3 V-2.7 V corresponds to the neutral range, 2.8 V corresponds to the target low speed of forward travel and 5 V corresponds to the target maximum speed of forward travel. In this way, the single direction/speed control lever 75 can set both a desired one of the forward and rearward travel directions and a desired speed between the high and low travel speeds.

Referring back to FIG. 4, the control unit 56, on the basis of position information of the direction/speed control lever 75 received from the potentiometer 75a, controls the operation of the left and right motors 33L and 33R and performs feedback control so that the rotating speeds of the motors 33L and 33R assume predetermined values. As a consequence, the left and right driving wheels 21L and 21R can rotate in desired directions and at desired speeds.

During depression, by the human operator, of the left turning operation switch 81L, the left electromagnetic brake 37L is kept in the braking state on the basis of a switch-ON signal generated by the turning operation switch 81L. Similarly, during depression, by the human operator, of the right turning operation switch 81R, the right electromagnetic brake 37R is kept in the braking state on the basis of a switch-ON signal generated by the turning operation switch 81R. Once the human operator lets go of the electromagnetic brake 37L or 37R, that electromagnetic brake 37L or 37R is brought back to the open or non-braking state. Namely, the snow removing machine 10 turns left only while the left turning operation switch 81L is being depressed by the human operator, while the snow removing machine 10 turns right only while the right turning operation switch 81R is being depressed by the human operator.

Then, the snow removing machine 10 can be caused to stop traveling by (1) shifting the main switch 71 back to the OFF position, (2) shifting the direction/speed lever 75 back to the neutral position;, or (3) letting go of the travel preparation lever 77.

The travel of the machine 10 can be terminated using short-circuiting brake circuits (regenerative brakes) 38L and 38R that short-circuit between the opposite terminals of the motors 33 and 33R. The short-circuiting brake circuits permit rapid braking of the motors 33L and 33R.

As the main switch 71 is shifted back to the "OFF" position after termination of the machine travel, the electromagnetic brakes 37L and 37R are brought to the braking state, which achieves generally the same effect as when a parking brake is activated.

Now, a description will be given about a first embodiment of control performed by the control unit 56 when the snow removing machine 10 is caused to travel by only the power supplied from the battery 55, with reference to flow charts of FIGS. 6A and 6B as well as FIGS. 3 and 4. The control sequence is initiated once the main switch 71 of FIG. 3 has been shifted from the "OFF" position to the "ON" position.

Figure 6A:
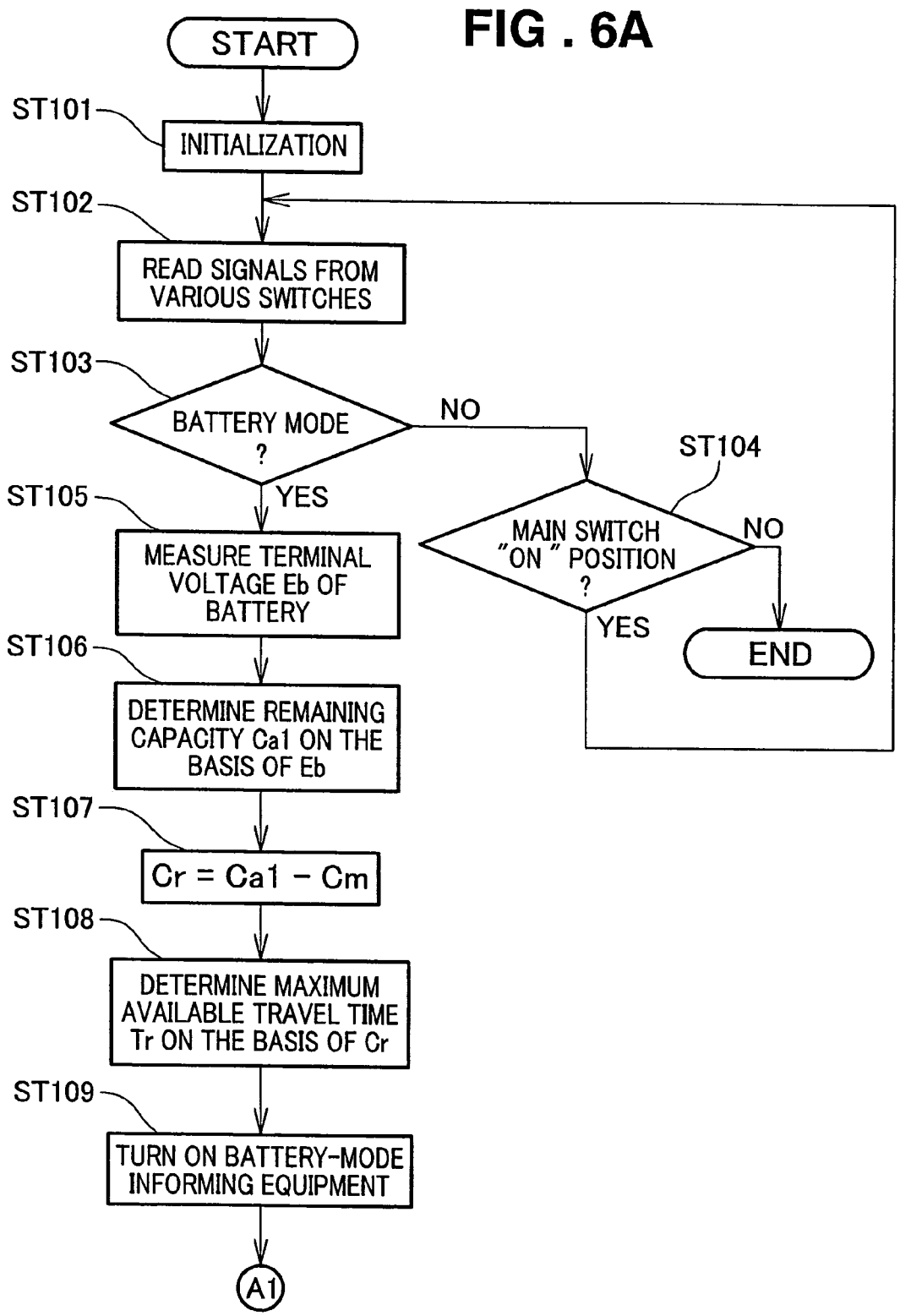
FIGS. 6A and 6B are a flow chart showing a first embodiment of control performed by a control unit in the machine shown in FIG. 4.
Figure 6B:
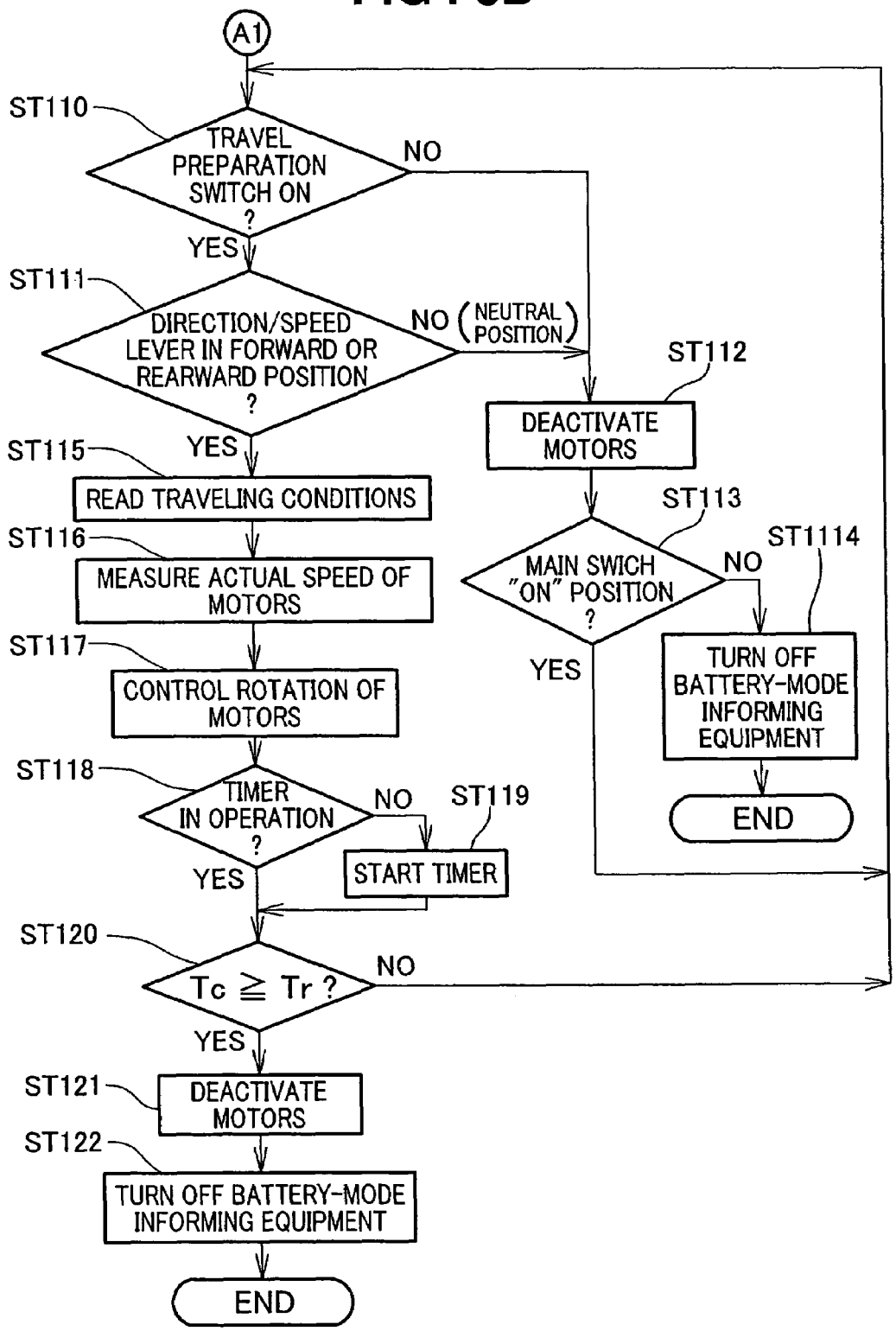

Step ST101 of FIG. 6A: Necessary initialization is performed.

Step ST102: Switch (and lever) signals from the main switch 71, direction/speed lever 75, switch 77a of the travel preparation lever 77, left and right turning operation switches 81L and 81R, battery mode switch 83, etc. are read as input signals to the control unit 56.

Step ST103: It is determined whether or not the machine 10 is currently in the battery mode. With a negative (NO) determination, the control 56 proceeds to step ST104, while, with an affirmative (YES) determination, the control 56 goes to step ST105. Whether or not the machine 10 is currently in the battery mode can be determined by any of the following two approaches.

As the first approach, the machine 10 is determined as being in the battery mode when the battery mode switch 83 is ON.

As the second approach, the machine 10 is determined as being in the battery mode when the left and right turning operation switches 81L and 81R have been ON simultaneously for a predetermined continuous time period, e.g. three sec. Only either one of the left and right turning operation switches 81L and 81R is operated when the snow removing machine 10 is to be turned left or right; therefore, normally, both of the turning operation switches 81L and 81R are not operated simultaneously. Thus, the machine 10 may be determined as being in the battery mode when the special operation not performed normally has been detected.

If the second approach is employed, it is not necessary for the human operator to let go of and re-grip any of the handles 51L, 51R, which can enhance the controllability of the snow removing machine 10. Further, there is no need to provide a separate battery mode switch, which can reduce the number of necessary components of the machine 10.

Step ST104: A determination is made as to whether the main switch 71 is currently in the "ON" position. If answered in the affirmative, the control 56 reverts to step ST102, but if answered in the negative, the control 56 terminates the control flow. NO determination is made here if the main switch 71 has been shifted to the "OFF" position or "ST" (start) position without the machine 10 being shifted to the battery mode.

Step ST105: Terminal voltage Eb of the battery 55 immediately after the shift to the battery mode is measured; for this purpose, an actual terminal voltage of the battery 55 may be measured via the voltage sensor 96.

Figure 7:
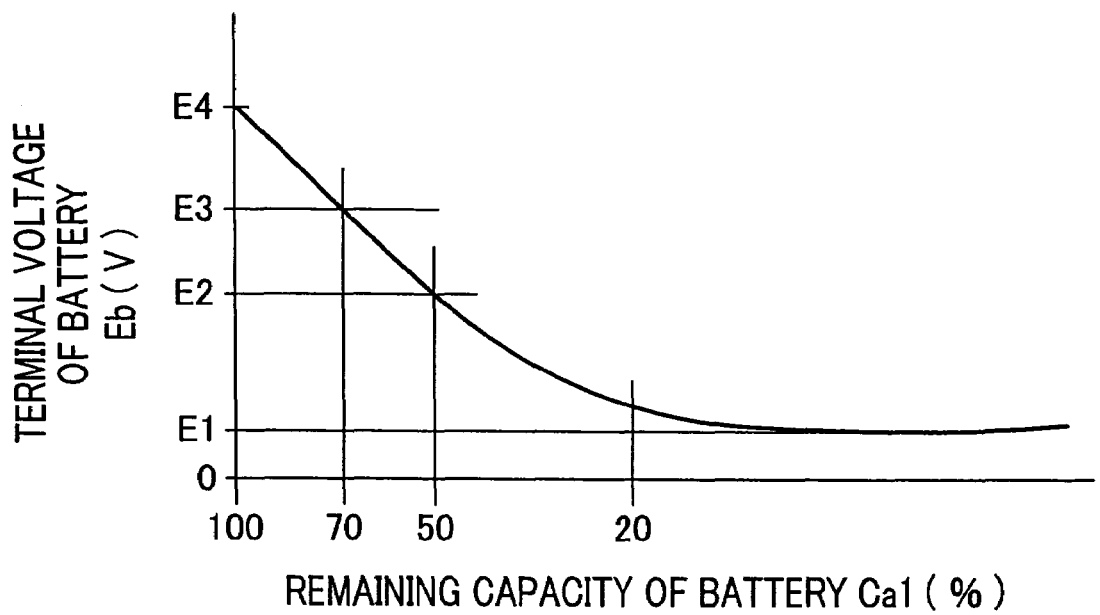
FIG. 7 is a diagram showing a map for determining a remaining capacity of a battery, employed in the snow removing machine of the invention, on the basis of a terminal voltage of the battery.

Step ST106: Remaining capacity Ca1 of the battery 55 immediately after the shift to the battery mode is measured. Specifically, the remaining battery capacity Ca1 is determined from a battery remaining capacity map illustrated in FIG. 7. FIG. 7 shows a characteristic curve of the remaining capacity Ca1 versus the terminal voltage Eb of the battery 55, where the horizontal axis represents the remaining capacity Ca1 (%) while the vertical axis represents the terminal voltage Eb of the battery 55.

The "remaining capacity Ca1" of the battery 55 means an amount of electric power obtainable from the battery 55 when the charged battery is discharged with a given current, which is normally represented by a product between a discharge current and discharge time in ampere-hour (Ah). In the illustrated example, however, the remaining capacity Ca1 of the battery 55 is represented by percentage (%) relative to a 100% capacity of the fully-charged battery 55.

From the remaining capacity map of FIG. 7, it can be seen that the remaining capacity Ca1 approaches 100% as the terminal voltage Eb increases but approaches 0% as the terminal voltage Eb decreases. Specifically, the remaining capacity Ca1 is 70% when the terminal voltage Eb is at level E3 and 50% when the terminal voltage Eb is at level E2. The remaining capacity Ca1 corresponding to the terminal voltage Eb can be determined using this map.

In the instant embodiment, a plurality of such remaining capacity maps were prepared in accordance with data actually derived for different batteries 55 mounted on a plurality of snow removing machines 10 and then stored in an internal memory of the control unit 56. The remaining capacity maps were prepared in consideration of specific discharge characteristics of the individual batteries 55 because the discharge characteristics differ among the batteries 55. Therefore, it is possible to readily determine a relatively-accurate remaining capacity Ca1 by reading out any one of the remaining capacity maps.

Step ST107: Travel-permitting capacity Cr of the battery 55 is determined by subtracting a preset lower limit value Cmi of the remaining capacity from the remaining capacity Ca1 (i.e., Cr=Ca1−Cmi). The "lower limit value Cmi of the remaining capacity" represents a minimum remaining capacity (amount of electric power) of the battery 55 that is considered necessary to activate the engine 34 at least once. In the instant embodiment, the lower limit value Cmi of the remaining capacity is preset, for example, at 20%. The "travel-permitting capacity" Cr means a remaining capacity (amount of electric power) of the battery 55 that can cause the snow removing machine 10 to travel after the machine 10 has been shifted to the battery mode; therefore, this travel-permitting capacity Cr may also be referred to as "travel-permitting remaining capacity". In the instant embodiment, the travel-permitting capacity Cr is represented by percentage (%).

Figure 8:
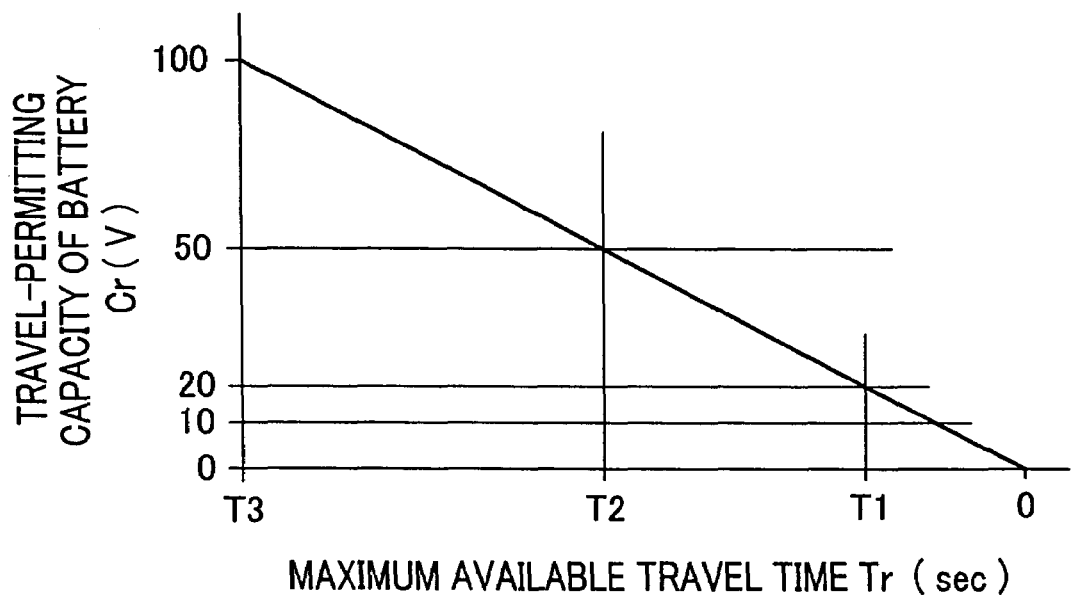
FIG. 8 is a diagram showing a map defining relationship between a travel-permitting capacity of the battery and a maximum available travel time of the machine.

Step ST108: Maximum available travel time Tr, up to which the snow removing machine 10 can travel with the travel-permitting capacity Cr, is determined on the basis of the travel-permitting capacity Cr. Specifically, in the instant embodiment, the maximum available travel time Tr is determined on the basis of a maximum available travel time map of FIG. 8. FIG. 8 shows a characteristic curve of the maximum available travel time Tr corresponding to the travel-permitting capacity Cr of the battery 55, where the horizontal axis represents the maximum available travel time Tr (sec.) while the vertical axis represents the travel-permitting capacity Cr (%) of the battery 55.

From the maximum available travel time map of FIG. 8, it can be seen that the maximum available travel time Tr increases as the travel-permitting capacity Cr increases but decreases as the travel-permitting capacity Cr decreases. Specifically, the maximum available travel time Tr takes the greatest value T3 when the travel-permitting capacity Cr is 100% and takes a zero value when the travel-permitting capacity Cr is 0%. Namely, the maximum available travel time Tr takes any one of values expressed as a linear line function). The maximum available travel time Tr corresponding to the travel-permitting capacity Cr can be determined using this map.

Step ST109: The control 56 moves on to step ST110 of FIG. 6B after turning on the informing display 84 and informing sound generator 85 as battery-mode informing equipment. The battery-mode informing equipment informs the human operator that the machine 10 has been shifted to the battery mode.

Step ST110: It is determined whether the switch 77a of the travel preparation lever 77 is currently ON. With a YES answer, the control 56 proceeds to step ST111, but, with a NO answer, the control 56 branches to step ST112. When the travel preparation lever 77 has been gripped by the human operator, a YES determination is made at this step.

Step ST111: A determination is made as to whether the direction/speed lever 75 is currently in the forward or rearward travel position. If answered in the negative, the control 56 branches to step ST112, but, if answered in the affirmative, the control 56 goes to step ST115 after initiating rotation of the motors 33L and 33R.

Step ST112: The motors 33L and 33R are deactivated upon satisfaction of the condition that the human operator has released or let go of the travel preparation lever 77 or has shifted the direction/speed lever 75 back to the neutral position (or range).

Step ST113: It is determined whether the main switch 71 is currently in the "ON" position. With a YES determination, the control 56 reverts to step ST110; otherwise, the control 56 branches to step ST114.

Step ST114: The control flow is brought to an end after the informing display 84 and informing sound generator 85 are turned off.

Step ST115: The control 56 reads current traveling conditions, such as the forward or rearward travel or turning movement, traveling speed, etc., of the snow removing machine 10. Target rotating speeds of the left and right motors 33L and 33R are read from the current position of the direction/speed lever 75.

Step ST116: Actual rotating speeds of the left and right motors 33L and 33R are determined, for example, by measuring the respective numbers of rotations of the motors 33L and 33R via the rotation sensors 98L and 98R.

Step ST117: The rotation of the left and right motors 33L and 33R is controlled in accordance with predetermined control signals, which are PI (Proportional and Integral) outputs in the case where PI control is performed on the motors 33L and 33R or PID (Proportional, Integral and Derivative) outputs in the case where PID control is performed on the motors 33L and 33R. Alternatively, the control signals may be pulse width modulation (PWM) signals.

Step ST118: It is determined whether a timer contained in the control 56 is currently in operation. If answered in the negative, the control 56 goes to step ST119, but, if answered in the affirmative, the control 56 proceeds to step ST120.

Step ST 119: The timer is reset (Tc=0) and started.

Step ST120: It is determined whether a counted time (elapsed time) Tc since the start of the timer has reached the above-mentioned maximum available travel time Tr. With a NO determination, the control 56 reverts to step ST110, but, with a YES determination, the control 56 moves on to step ST121.

Step ST121: The left and right motors 33L and 33R are deactivated upon satisfaction of the condition that the motors 33L and 33R have been rotated for the maximum available travel time Tr, i.e. the snow removing machine 10 has traveled for the maximum available travel time Tr. In this way, the above-mentioned minimum remaining capacity Cmi can be secured, i.e. left unconsumed.

Step ST122: The control flow is brought to an end after the informing display 84 and informing sound generator 85 are turned off.

As clear from the foregoing, the first embodiment is characterized by allowing the left and right motors 33L and 33R to be rotated by only the electric power supplied from the battery 55 with the engine 34 kept deactivated, in response to selection of the battery mode.

Namely, by shifting the machine 10 to the battery mode, the left and right motors 33L and 33R are driven to rotate by only the power supplied from the battery 55 with the engine 34 kept deactivated. Thus, only the motors 33L and 33R are driven by the battery 55, without the engine 34 being driven, to thereby cause the machine 10 to temporarily travel for a short distance, such as when the machine 10 is to be moved in or out of a storage space or transferred from the storage space to a nearby working place. Therefore, when the machine 10 is to be moved or transferred, the snow removing machine 10 can be handled with increased ease without unwanted noise being produced from the engine 34; for this reason, the above-described arrangements of the invention will prove particularly useful early in the morning or in other quiet time zones.

Further, because the first embodiment can eliminate a need to operate the engine 34 more than necessary, it can avoid excessive use of the engine 34 and save consumption of fuel etc. necessary for operating the engine 34. Furthermore, the control unit 56 in the embodiment is characterized by: measuring the terminal voltage Eb of the battery 55 immediately after the machine 10 is shifted to the battery mode; then determining the remaining capacity Ca1 of the battery 55 on the basis of the terminal voltage Eb;

determining the travel-permitting capacity Cr by subtracting, from the remaining capacity Ca1, the lower limit value Cmi of the remaining capacity, i.e. minimum remaining capacity necessary to activate the engine 34 at least once; then determining the maximum available travel time Tr on the basis of the travel permitting remaining capacity Cr; and permitting the rotation of the left and right motors 33L and 33R for the maximum available travel time Tr.

Even when the power consumption has progressed considerably in the battery 55 as only the motors 33L and 33R are driven with the engine 34 kept deactivated, the motors 33L and 33R can be rotated for the maximum available travel time Tr with the minimum remaining capacity Cmi, necessary to activate the engine 34 at least once, left unconsumed. Namely, when only the motors 33L and 33R are driven, the maximum available travel time of the snow removing machine 10 is limited so that the engine 34 can be reliably activated whenever necessary despite reduction in the remaining capacity Ca1 of the battery 55.

Because the engine 34 can be re-driven to resume the work promptly, the handling ease of the snow removing machine 10 can be enhanced. The battery 55 can be recharged via the power generator 54 through activation of the engine 34. Further, preventing over-discharge of the battery 55 in the above-described manner can further enhance the performance and life of the battery 55.

Figure 9:
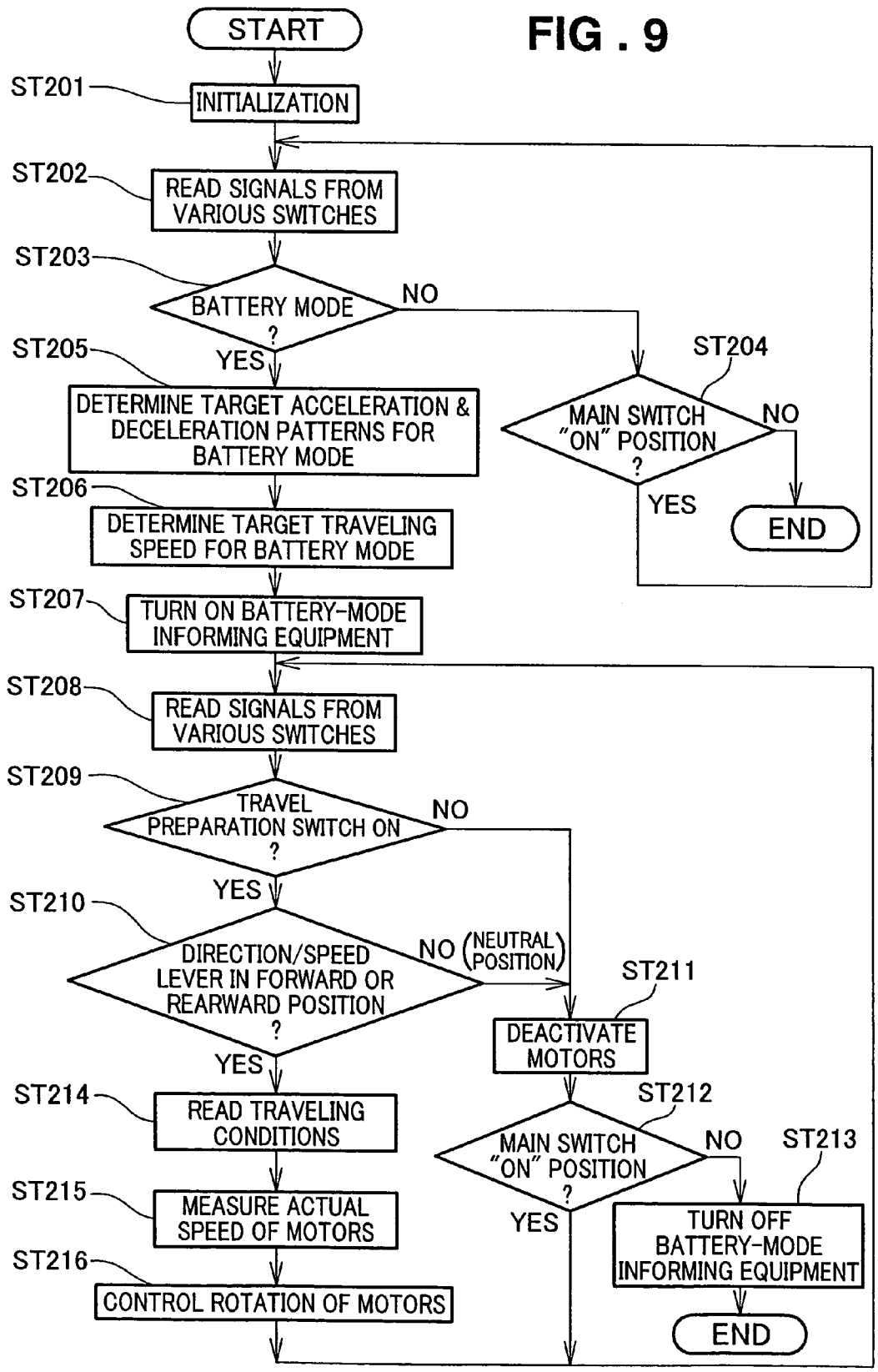
FIG. 9 is a flow chart showing a second embodiment of control performed by the control unit.

Next, with reference to FIGS. 3 and 4 and a flow chart of FIG. 9, a description will be given about a second embodiment of control performed by the control 56, which is arranged to minimize consumption of the power of the battery 55 when the snow removing machine 10 is driven to travel by only the power of the battery 55. Like the above-described first embodiment, the second embodiment is initiated by the control 56 when the main switch 71 has been shifted from the "OFF" position to the "ON" position.

Step ST 201: Necessary initialization process is performed.

Step ST202: Switch (and lever position) signals from the main switch 71, direction/speed lever 75, switch 77a of the travel preparation lever 77, left and right turning operation switches 81L and 81R, battery mode switch 83, etc. are read as input signals to the control 56.

Step ST203: It is determined whether the machine 10 is currently in the battery mode. With a negative (NO) determination, the control 56 proceeds to step ST204, while, with an affirmative (YES) determination, the control 56 goes to step ST205. Specifically, whether or not the machine 10 is in the battery mode is determined in any one of the two ways explained above in relation to the first embodiment.

Step ST204: A determination is made as to whether the main switch 71 is currently in the "ON" position. If answered in the affirmative, the control 56 reverts to step ST202, but if answered in the negative, the control 56 terminates the control flow. NO determination is made here if the main switch 71 has been shifted to the "OFF" position or "ST" (start) position without the machine 10 being shifted to the battery mode.

Step ST205: After the machine 10 has been shifted to the battery mode, the control 56 determines a target acceleration pattern and target deceleration pattern for the battery mode.

The battery-mode target acceleration pattern is for setting target acceleration Ab for the battery mode, while the battery-mode target deceleration pattern is for setting target deceleration Rb for the battery mode. The "target acceleration Ab for the battery mode" and "target deceleration Rb for the battery mode" mean target acceleration Ab and target deceleration Rb of the traveling units 20L and 20R when the motors 33L and 33R are driven to rotate by only the electric power supplied from the battery 55.

For each of the traveling units 20L and 20R, the target acceleration Ab for the battery mode is set to a value smaller than a value of target acceleration Au of the traveling unit 20L or 20R in an "ordinary mode" where the motors 33L and 33R are rotated by the engine 34 (i.e., target acceleration Au for the ordinary mode) (Ab<Au). For example, the target acceleration Ab for the battery mode is set to a value approximately in a range of ½-¾ of the target acceleration Au for the ordinary mode.

For each of the traveling units 20L and 20R, the target deceleration Rb for the battery mode is set to a value identical or almost identical to target deceleration Ru of the traveling unit 20L or 20R in the ordinary mode (Rb=Ru, or Rb≈Ru). The target deceleration Ru for the ordinary mode is set to a value equal to or greater than a value of the target acceleration Au for the ordinary mode (Ru≧Au).

The reason for making the settings as set forth above is as follows. Namely, as shown in FIG. 4, the snow removing machine 10 of the invention employs the regenerative brakes 38L and 38R, and using the regenerative brakes 38L and 38R as much as possible when the travel of the machine 10 is to be stopped can promote conversion of the brake energy into electric power to recharge the battery 55.

Figure 10:
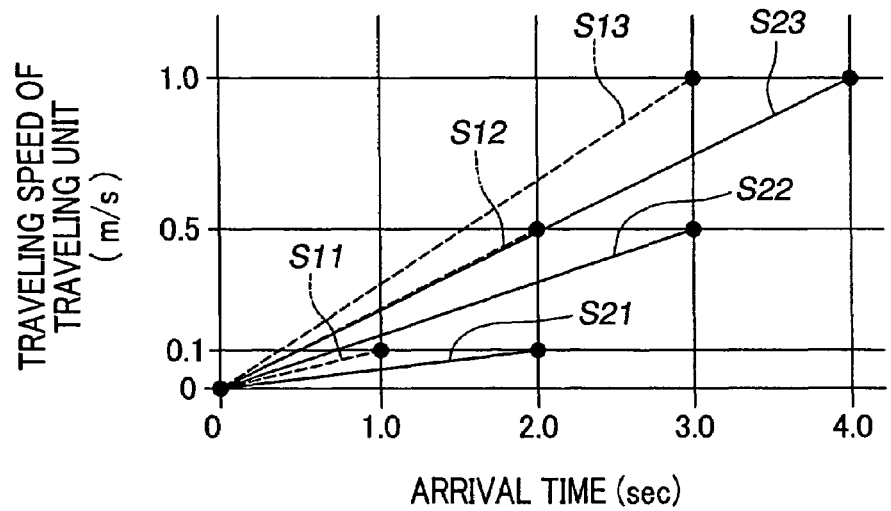
FIG. 10 is a map defining acceleration and deceleration of a traveling unit.

More specifically, the above-mentioned target acceleration Ab and target deceleration Rb for the battery mode for each of the traveling units 20L and 20R is determined from an acceleration/deceleration map shown in FIG. 10, which is prestored in the internal memory of the control unit 56.

The acceleration/deceleration map for the traveling units shown in FIG. 10 defines characteristic curves each intended to determine a time necessary for accelerating or decelerating the traveling unit to a predetermined traveling speed, i.e. a necessary arrival time for the traveling unit to arrive at the predetermined time, with the horizontal axis representing the necessary arrival time (sec.) and the vertical axis representing a traveling speed of the traveling unit (m/s).

Broken straight lines S11, S12 and S13 represent acceleration and deceleration in the ordinary mode, and solid straight lines S21, S22 and S23 represent acceleration and deceleration in the battery mode.

The straight line S11 indicates that, where the target acceleration Au for the ordinary mode is set at a minimum value, it takes 1.0 sec. to accelerate the traveling speed from zero up to 0.1 m/s.

The straight line S12 indicates that, where the target acceleration Au for the ordinary mode is set at a medium value, it takes 2.0 sec. to accelerate the traveling speed from zero up to 0.5 m/s.

The straight line S13 indicates that, where the target acceleration Au for the ordinary mode is set at a maximum value, it takes 3.0 sec. to accelerate the traveling speed from zero up to 1.0 m/s.

On the other hand, the straight line S21 indicates that, where the target acceleration Ab for the battery mode is set at a minimum value, it takes 2.0 sec. to accelerate the traveling speed from zero up to 0.1 m/s.

The straight line S22 indicates that, where the target acceleration Ab for the battery mode is set at a medium value, it takes 3.0 sec. to accelerate the traveling speed from zero up to 0.5 m/s.

The straight line S23 indicates that, where the target acceleration Ab for the battery mode is set at a maximum value, it takes 4.0 sec. to accelerate the traveling speed from zero up to 1.0 m/s.

As clear from the foregoing, the target acceleration Ab for the battery mode is set to a value smaller than that of the target acceleration Au for the ordinary mode. Thus, it can be seen that the time required to accelerate the traveling unit to a given traveling speed is longer in the battery mode than in the ordinary mode.

Further, as stated above, the target deceleration Ru for the ordinary mode is set to a value equal to or greater than that of the target acceleration Au for the ordinary mode, and the target deceleration Rb for the battery mode is set to a value equal to or substantially equal to that of the target deceleration Ru for the ordinary mode. Therefore, the time required to decelerate the traveling unit to a given traveling speed in each of the ordinary and battery mode is substantially equal to the time required to accelerate the traveling unit to the traveling speed in the ordinary mode, which can therefore be depicted as the straight line S11, S12 or S13.

In this way, it is possible to use the map of FIG. 10 to determine the target acceleration Au and deceleration Ru for the ordinary mode and the target acceleration Ab and deceleration Rb for the battery mode. Specifically, by setting the direction/speed lever 75 to the "forward travel" or "rearward travel" position, the target acceleration Ab is selected from the map of FIG. 10 in any one of the following ways.

(1) The pattern of the target acceleration Ab for the battery mode represented by the straight line S21 is selected by the human operator setting the direction/speed lever 75 at the low speed position (2) The pattern of the target acceleration Ab for the battery mode represented by the straight line S22 is selected by the human operator setting the direction/speed lever 75 at the medium speed position (3) The pattern of the target acceleration Ab for the battery mode represented by the straight line S23 is selected by the human operator setting the direction/speed lever 75 at the high speed position Note that, when the machine 10 is in the ordinary mode where the motors are rotated with electric power supplied by operation of the engine 34, the rotation of the motors is controlled on the basis of the target acceleration Au and target deceleration Ru for the ordinary mode.

Step ST206: Target traveling speed pattern for the battery mode is determined. The battery-mode target traveling speed pattern is for setting a target traveling speed for the battery mode. The "target traveling speed for the battery mode" means a target speed of the traveling unit 20L or 20R when the motor 33L or 33R is driven to rotate by only the electric power supplied from the battery 55. Upper limit of the battery-mode target traveling speed will hereinafter be referred to as a target maximum traveling speed Smb for the battery mode.

The target maximum traveling speed Smb for the battery mode is set to a value smaller than a value of a target maximum traveling speed Smu of the traveling unit 20L or 20R in the ordinary mode, i.e., target maximum traveling speed Smu for the ordinary mode (Smb<Smu).

Figure 11:
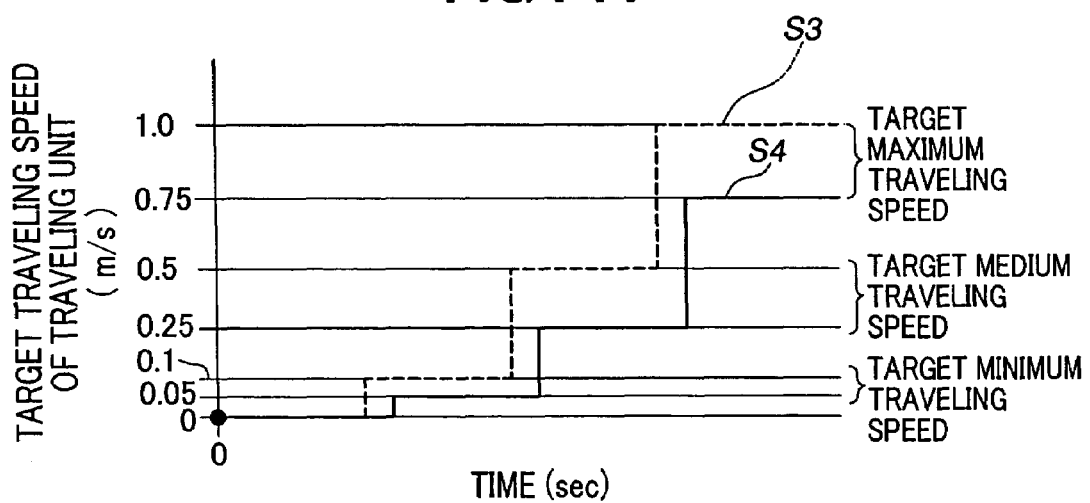
FIG. 11 is a map defining target traveling speeds of the traveling unit.

Specifically, such a target traveling speed for the battery mode is determined, for each of the traveling units 20L and 20R, from a target traveling speed map shown in FIG. 11, which is also prestored in the internal memory of the control 56.

The target traveling speed map for the traveling units shown in FIG. 11 defines characteristic curves for determining a target traveling speed of the traveling unit, where the horizontal axis represents the time (sec.) and the vertical axis represents the target traveling speed of the traveling unit (m/s).

Broken line S3 indicates that a target traveling speed can be set stepwise in the ordinary mode with a target minimum traveling speed set at 0.1 m/s, target medium traveling speed set at 0.5 m/s and target maximum traveling speed (i.e., the above-mentioned target maximum traveling speed Smu for the ordinary mode) set at 1.0 m/s.

Solid line S4 indicates that a target traveling speed can be set stepwise in the battery mode with the target minimum traveling speed set at 0.05 m/s, target medium traveling speed set at 0.25 m/s and target maximum traveling speed (i.e., the above-mentioned target maximum traveling speed Smb for the battery mode) set at 0.75 m/s.

As clear from the foregoing, the target minimum traveling speed, target medium traveling speed and target maximum traveling speed Smb for the battery mode are set to values smaller than those of the target minimum traveling speed, target medium traveling speed and target maximum traveling speed Smu for the ordinary mode. As an example, the target minimum traveling speed, target medium traveling speed and target maximum traveling speed Smb for the battery mode are set to values in a range of about ½-¾ of those of the corresponding speeds for the ordinary mode.

In accordance with the target traveling speed map of FIG. 11, the target maximum traveling speed Smb for the battery mode is limited to 0.75 m/s while the target maximum traveling speed Smu for the ordinary mode is limited to 1.0 m/s, when the same direction/speed lever 75 of FIG. 5 is set at the maximum speed position in the "forward travel" or "rearward travel" range.

Thus, using the target traveling speed map of FIG. 11, it is possible to determine the target minimum traveling speed, medium traveling speed and maximum traveling speed (Smb) for the battery mode. Note that, in the ordinary mode where the motors are rotated with electric power supplied by operation of the engine 34, the rotation of the motors is controlled on the basis of the target traveling speeds for the ordinary mode (i.e., target minimum traveling speed, medium traveling speed and maximum traveling speed (Smu) for the ordinary mode).

Step ST207: The battery-mode informing equipment, comprising the informing display 84 and informing sound generator 85, is turned on to inform the human operator that the machine 10 has been shifted to the battery mode.

Step ST208: Switch (and lever position) signals from the main switch 71, direction/speed lever 75, switch 77a of the travel preparation lever 77, left and right turning operation switches 81L and 81R, battery mode switch 83, etc. are read as input signals to the control unit 56.

Step ST209: It is determined whether the switch 77a of the travel preparation lever 77 is currently ON. With a YES answer, the control 56 proceeds to step ST2 10, but, with a NO answer, the control 56 branches to step ST211. When the travel preparation lever 77 has been gripped by the human operator, a YES determination is made at this step.

Step ST210: A determination is made as to whether the direction/speed lever 75 is currently in the forward or rearward travel position. If answered in the negative, the control 56 branches to step ST211, but, if answered in the affirmative, the control 56 goes to step ST214. Thus, the motors 33L and 33R start their rotation.

Step ST211: The motors 33L and 33R are deactivated upon satisfaction of the condition that the human operator has released or let go of the travel preparation lever 77 or has shifted the direction/speed lever 75 back to the neutral position (or range).

Step ST212: It is further determined whether the main switch 71 is currently in the "ON" position. With a YES determination, the control 56 reverts to step ST208; otherwise, the control 56 branches to step ST213.

Step ST213: The control flow is brought to an end after the informing display 84 and informing sound generator 85 are turned off.

Step ST214: The control unit 56 reads current traveling conditions, such as the forward or rearward travel or turning movement, traveling speed, etc., of the snow removing machine 10. For example, operation data based on the current position of the direction/speed lever 75 are read.

Step ST215: Actual rotating speeds of the left and right motors 33L and 33R are measured, for example, by measuring the respective numbers of rotations of the motors 33L and 33R via the rotation sensors 98L and 98R.

Step ST216: The rotation of the left and right motors 33L and 33R is controlled in accordance with predetermined control signals on the basis of the traveling conditions detected at step S214 above, and the control reverts to step S208.

Specifically, latest target acceleration Ab, target deceleration Rb and target traveling speeds for the battery mode are determined by applying the operation data, based on the current position of the direction/speed lever 75, to the target acceleration Ab, target deceleration Rb and target traveling speeds for the battery mode (target minimum traveling speed, target medium traveling speed and target maximum traveling speed Smb for the battery mode). Then, the rotation of the motors 33L and 33R is controlled on the basis of the thus-determined speed values. The predetermined control signals may be ones corresponding to PI outputs in the case where PI control is performed on the motors 33L and 33R or PID outputs in the case where PID control is performed on the motors 33L and 33R. Alternatively, the control signals may be pulse width modulation (PWM) signals.

As clear from the foregoing, the second embodiment is arranged to set the target acceleration Ab for the battery mode to a value smaller than that of the target acceleration Au for the ordinary mode and also set the target maximum traveling speed Smb for the battery mode to a value smaller than that of the target maximum traveling speed Smu for the ordinary mode, so as to control the rotation of the motors 33L and 33R on the basis of the smaller values. In this way, it is possible to lower the power consumption rate of the battery 55 and hence increase the maximum available travel time of the snow removing machine 10 when the engine 34 is kept deactivated.

The snow removing machine 10 is caused to travel in the battery mode only when it should temporarily travel only a short distance, such as when it is to be moved in or out of a storage space or transferred from the storage space to a nearby working place. Therefore, in the battery mode, there is no substantive harm in limiting the acceleration and traveling speed of the snow removing machine 10.

It should also be apparent that specific numerical values of the acceleration/deceleration map of FIG. 10 and target traveling speed map of FIG. 11 may be set as desired.

Next, with reference to FIGS. 3 and 4 and a flow chart of FIGS. 12A-12D, a description will be given about a third embodiment of control performed by the control 56, which is arranged to avoid over-discharge of the battery 55 when the snow removing machine 10 is driven to travel by only the power of the battery 55. Like the first embodiment, the third embodiment is initiated by the control unit 56 when the main switch 71 has been shifted from the "OFF" position to the "ON" position.

Figure 12A:
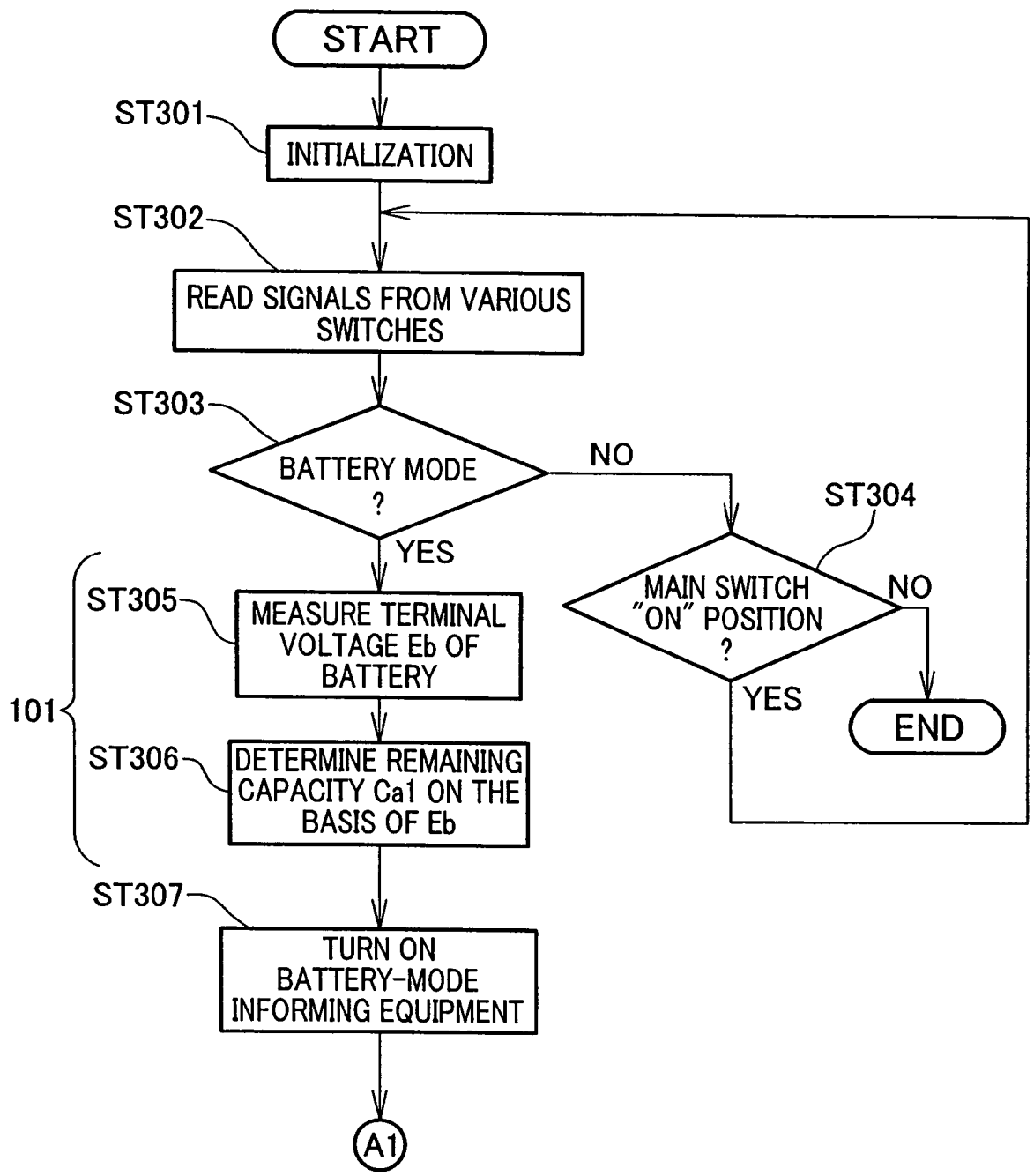

Step ST301 of FIG. 12A: Necessary initialization process is performed.

Step ST302: Switch (and lever position) signals from the main switch 71, direction/speed lever 75, switch 77a of the travel preparation lever 77, left and right turning operation switches 81L and 81R, battery mode switch 83, etc. are read as input signals to the control unit 56.

Step ST303: It is determined whether the machine 10 is currently in the battery mode. With a negative (NO) determination, the control 56 proceeds to step ST304, while, with an affirmative (YES) determination, the control 56 goes to step ST305. Specifically, whether or not the machine 10 is in the battery mode is determined in any one of the two ways explained above in relation to the first embodiment.

Step ST304: A determination is made as to whether the main switch 71 is currently in the "ON" position. If answered in the affirmative, the control 56 reverts to step ST302, but if answered in the negative, the control 56 terminates the control flow. NO determination is made here if the main switch 71 has been shifted to the "OFF" position or "ST" (start) position without the machine 10 being shifted to the battery mode.

Step ST305: Terminal voltage Eb of the battery 55 immediately after the shift to the battery mode is measured; for this purpose, an actual terminal voltage of the battery 55 may be measured via the voltage sensor 96.

Step ST306: Remaining capacity Ca1 of the battery 55 immediately after the shift to the battery mode is measured. Specifically, the remaining battery capacity Ca1 is determined from the battery remaining capacity map of FIG. 7 as in the above-described first embodiment.

Step ST307: The informing display 84 and informing sound generator 85 are turned on to inform the human operator that the machine 10 has been shifted to the battery mode.

Step ST308: Switch (and lever position) signals from the main switch 71, direction/speed lever 75, switch 77a of the travel preparation lever 77, left and right turning operation switches 81L and 81R, battery mode switch 83, etc. are read as input signals to the control 56.

Step ST309: It is determined whether the switch 77a of the travel preparation lever 77 is currently ON. With a YES answer, the control 56 proceeds to step ST310, but, with a NO answer, the control 56 branches to step ST311. When the travel preparation lever 77 has been gripped by the human operator, a YES determination is made at this step.

Step ST310: A determination is made as to whether the direction/speed lever 75 is currently in the forward or rearward travel position. If answered in the negative, the control 56 branches to step ST311, but, if answered in the affirmative, the electric motors 33L and 33R are activated, and the control 56 goes to step ST314.

Step ST311: The motors 33L and 33R are deactivated upon satisfaction of the condition that the human operator has let go of the travel preparation lever 77 or has shifted the direction/speed lever 75 back to the neutral position (or range).

Step ST312: It is determined whether the main switch 71 is currently in the "ON" position. With a YES determination, the control 56 reverts to step ST308; otherwise, the control 56 branches to step ST313.

Step ST313: The control flow is brought to an end after the informing display 84 and informing sound generator 85 are turned off.

Step ST314: The control 56 reads current traveling conditions, such as the forward or rearward travel or turning movement, traveling speed, etc., of the snow removing machine 10. For example, operation data based on the current position of the direction/speed lever 75 are read.

Step ST315: Actual rotating speeds of the left and right motors 33L and 33R are measured, for example, by measuring the respective numbers of rotations of the motors 33L and 33R via the rotation sensors 98L and 98R.

Step ST316: The rotation of the left and right motors 33L and 33R is controlled in accordance with predetermined control signals based on the traveling conditions and actual rotating speeds of the motors 33L and 33R. The predetermined control signals may be ones corresponding to PI outputs in the case where PI control is performed on the motors 33L and 33R or PID outputs in the case where PID control is performed on the motors 33L and 33R. Alternatively, the control signals may be pulse width modulation (PWM) signals.

Step ST317: Current terminal voltage Eb of the battery 55 is measured; for this purpose, an actual terminal voltage of the battery 55 may be measured via the voltage sensor 96.

Step ST318: Present discharge current A1 (consumed current A1) of the battery 55 is measured; for this purpose, an actual discharge current of the battery 55 may be measured via the current sensor 97.

Step ST319: Current discharge amount Ca2 of the battery 55 is calculated on the basis of the terminal voltage Eb and discharge current A1. Specifically, a ratio, to a capacity Pw of the fully-charged battery 55, of a product between the terminal voltage Eb and the discharge current A1 is calculated in terms of a percentage (%), and the thus-calculated ratio is set as the discharge amount Ca2; namely, Ca2=(Eb×A1/Pw)×100. The "capacity Pw of the fully-charged battery 55", which corresponds to the 100% remaining capacity of FIG. 7, is represented by V·A (Volt·Ampere).

Step ST320: Current remaining capacity Ca1 of the battery 55 is determined. Specifically, a value calculated by subtracting the current discharge amount Ca2 of the battery 55 from the last remaining amount Ca1 is set as a new current remaining amount Ca1 (i.e., Ca1=Ca1−Ca2).

Step ST321: It is determined whether the current remaining amount Ca1 has reached the preset lower limit value Cmi of the remaining capacity. With a YES determination, the control 56 moves on to step ST322 of FIG. 12C, but, with a NO determination, the control 56 reverts to step ST308. The "lower limit value Cmi of the remaining capacity" represents a minimum remaining capacity (amount of electric power) of the battery 55 necessary to activate the engine 34 at least once. In the instant example, the lower limit value of the remaining capacity Cmi is preset, for example, at 20%.

Step ST322: Once the remaining amount Ca1 has reached the preset lower limit value Cmi, the motors 33L and 33R are deactivated.

Step ST323: Signal for requesting activation of the engine 34 is issued from the control 56 to the informing display 84 and informing sound generator 85.

Step ST324: Switch signal generated by the main switch 71 is read.

Step ST325: Current operating position of the main switch 71 is identified. The control 56 goes to step ST326 if the current operating position of the main switch 71 is "OFF", goes to step ST327 if the current operating position of the main switch 71 is "ST" (start), or reverts to step ST324 if the current operating position of the main switch 71 is "ON".

Step ST326: The control flow is brought to an end after the informing display 84 and informing sound generator 85 are turned off.

Step ST327: Once the human operator shifts the main switch 71 to the "ST" (start) position, the engine 34 is activated in response to the switch signal indicating that the main switch 71 has been shifted to the "ST" (start) position. The human operator may shift the main switch 71 to the "ON" position after the rotation of the engine 34 is stabilized.

Step ST328: Current terminal voltage Eb of the battery 55 is measured; for this purpose, an actual terminal voltage of the battery 55 may be measured via the voltage sensor 96.

Step ST329: Present charging current A2 (supplied current A2) to the battery 55 is measured; for this purpose, an actual charging current to the battery 55 may be measured via the current sensor 97.

Step ST330: Current charge amount Ca3 of the battery 55 is calculated on the basis of the terminal voltage Eb and charging current A2. Specifically, a ratio, to the capacity Pw of the fully-charged battery 55, of a product between the terminal voltage Eb and the charging current A2 is calculated in terms of a percentage (%), and the thus-calculated ratio is set as the charge amount Ca3; namely, Ca3=(Eb×A2/Pw)×100.

Step ST331: Current remaining capacity Ca1 of the battery 55 is determined. Specifically, a value calculated by adding the current charge amount Ca3 of the battery 55 to the last remaining amount Ca1 is set as a new current remaining amount Ca1 (i.e., Ca1=Ca1+Ca3).

Step ST332: It is determined whether the current remaining amount Ca1 has reached a preset upper limit value Cma of the remaining capacity of the battery 55. With a YES determination, the control 56 moves on to step ST333 of FIG. 12D, but, with a NO determination, the control 56 reverts to step ST328. The "upper limit value Cma of the remaining capacity" means a remaining capacity of the battery 55 suitable for enhancing the performance and life of the battery 55. In the instant example, the upper limit value Cma of the remaining capacity is preset, for example, at about 50% that is about 30% higher than the lower limit value Cmi of the remaining capacity.

Step ST333: Once the remaining amount Ca1 has reached the preset upper limit value Cma, a signal requesting activation of the engine 34 is issued from the control 56 to the informing display 84 and informing sound generator 85, which in turn informs the human operator that the engine 34 should be deactivated.

Step ST334: Switch signal generated by the main switch 71 is read.

Step ST335: A determination is made as to whether the current operating position of the main switch 71 is "OFF". With a YES answer, the control 56 goes to step ST336, while, with a NO answer, the control 56 reverts to step ST334.

Step ST336: Once the human operator shifts the main switch 71 to the "OFF" position, the engine 34 is deactivated.

Step ST337: Upon satisfaction of the condition that the engine 34 has been deactivated, a signal requesting operation for shifting the main switch 71 to the "ON" position is issued from the control 56 to the informing display 84 and informing sound generator 85, which in turn prompts the human operator to shift the main switch 71 to the "ON" position.

Step ST338: Switch signal generated by the main switch 71 is read.

Step ST339: A determination is made as to whether the current operating position of the main switch 71 is "ON". With a YES answer, the control 56 goes to step ST340, while, with a NO answer, the control 56 reverts to step ST338.

Step ST340: Upon satisfaction of the condition that the main switch 71 has been shifted to the "ON" position, the control issues a battery-mode resumption informing signal to the informing display 84 and informing sound generator 85 and then reverts to step ST308. In accordance with the battery-mode resumption informing signal, the informing display 84 and informing sound generator 85 inform the human operator that the control of the motors 33L and 33R in the battery mode has been resumed. At step ST308 of FIG. 12B, the rotation of the left and right motors 33L and 33R is controlled with the engine 34 kept deactivated.

Figure 12B:
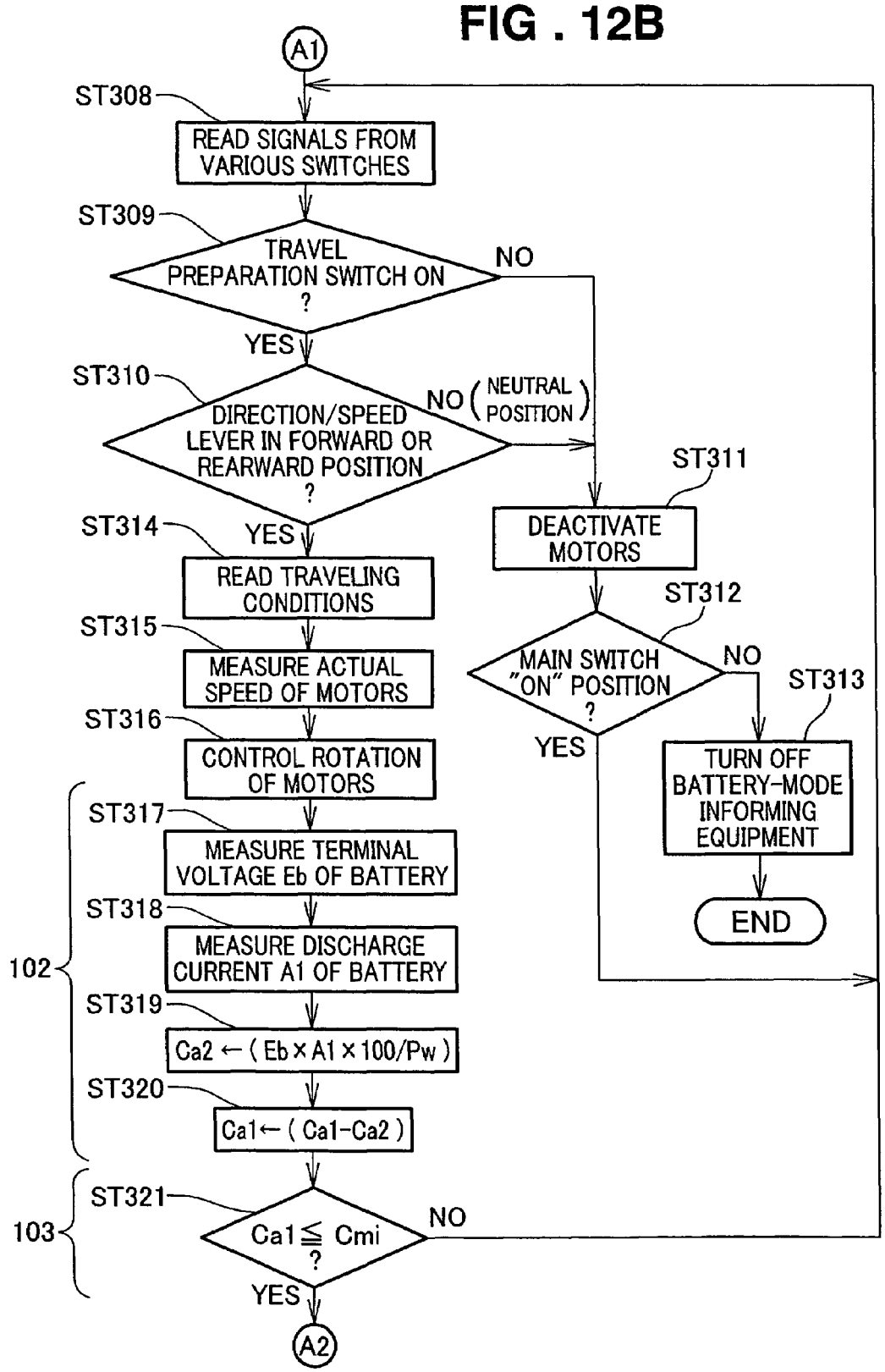
Figure 12D:
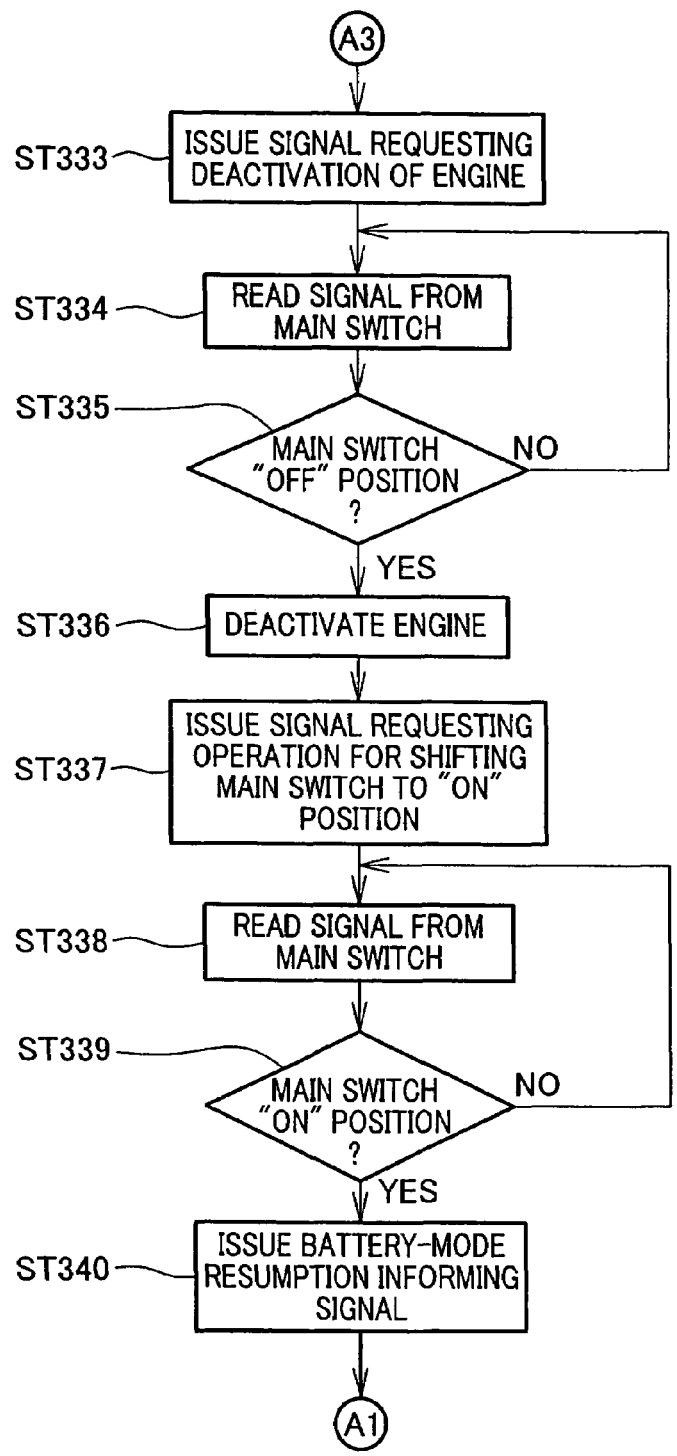

As may be apparent from the foregoing, the following steps in the control sequence of FIGS. 12A-12C constitute the following means.

(1) Steps ST305 and ST306 shown in FIG. 12A together constitute an "initial remaining-capacity measuring means 101" for measuring the remaining capacity Ca1 of the battery 55 immediately after the shift to the battery mode.

(2) Steps ST317, ST318, ST319 and ST320 shown in FIG. 12B together constitute a "during-discharge remaining-capacity measuring means 102" for constantly measuring the remaining capacity Ca1 of the battery 55 during the discharge of the battery 55.

(3) Step ST321 shown in FIG. 12A constitutes a "lower remaining capacity limit judging means 103" for presetting the lower limit value Cmi of the remaining capacity of the battery 55 and judging whether the remaining capacity Ca1 of the battery 55 has decreased to the lower limit value Cmi.

(4) Steps ST328, ST329, ST330 and ST331 shown in FIG. 12C together constitute a "during-charge remaining-capacity measuring means 104" for constantly measuring the remaining capacity Ca1 of the battery 55 during the charge of the battery 55.

(5) Step ST332 shown in FIG. 12C constitutes an "upper remaining capacity limit judging means 105" for presetting the upper limit value Cma of the remaining capacity of the battery 55 and judging whether the remaining capacity Ca1 of the battery 55 has increased to the upper limit value Cma.

(6) The above-mentioned initial remaining-capacity measuring means 101, during-discharge remaining-capacity measuring means 102 and during-charge remaining-capacity measuring means 104 together constitute "remaining-capacity measuring means".

As clear from the foregoing, the third embodiment is characterized by: setting the lower limit value Cmi of the remaining capacity of the battery 55 that represents a minimum remaining capacity necessary to activate the engine 34 at least once; constantly measuring the remaining capacityCa1 of the battery 55; and, upon satisfaction of the condition that the remaining capacity Ca1 of the battery 55 has decreased to the lower limit value Cmi, deactivating the motors 33L and 33R and issuing, to the display 84 and sound generator 85, the signal requesting activation of the engine 34.

With the arrangement that the motors 33L and 33R are deactivated when the remaining capacity Ca1 of the battery 55 has decreased to the lower limit value Cmi of the remaining capacity that represents a minimum remaining capacity necessary to activate the engine 34 at least once, the motors 33L and 33R can be safely rotated until the minimum remaining capacity Cmi necessary to activate the engine 34 at least once is reached. In this manner, the instant embodiment can reliably prevent the over-discharge of the battery 55.

Therefore, even when the remaining capacity Ca1 of the battery 55 has considerably decreased, the engine 34 can be activated reliably to promptly resume the desired work. Accordingly, the handling ease of the snow removing machine 10 can be enhanced. Further, preventing the over-discharge of the battery 55 in the above-described manner can further enhance the performance and life of the battery 55.

Furthermore, with the arrangement that, when the remaining capacity Ca1 of the battery 55 has decreased to the lower limit value Cmi of the remaining capacity, the display 84 and sound generator 85 prompt the human operator to activate the engine 34, the human operator can activate the engine 34 to drive the power generator 54 so as to recharge the battery 55 even during execution of the battery mode.

Because the human operator can activate the engine 34 to recharge the battery 55 in the above-mentioned manner, the machine 10 in the battery mode can be controlled, and handled with enhanced efficiency and ease.

Furthermore, in the battery mode, the control 56 constantly measures the remaining capacity Ca1 of the battery 55 while the engine 14 is operating to drive the power generator 54 so as to recharge the battery 55, and, upon satisfaction of the condition that the remaining capacity Ca1 of the battery 55 has increased to the upper limit value Cma, the control 56 issues, to the display 84 and sound generator 85, the signal requesting deactivation of the engine 34. Thus, the human operator can properly deactivate the engine 34, in accordance with information by the display 84 and sound generator 85, to thereby terminate the charge of the battery 55. After that, the human operator may again activate the motors 33L and 33R so as to allow the machine 10 to temporarily travel a short distance, as necessary.

Because the human operator can deactivate the engine 34 to terminate the charge of the battery 55 in the above-mentioned manner, the controllability and handling ease of the machine 10 in the battery mode can be even further enhanced. Preventing the overcharge of the battery 55 in the above-described manner can further enhance the performance and life of the battery 55.

The remaining capacity Ca1 of the battery 55 may be measured either directly or indirectly. For example, the initial remaining-capacity measuring means 101 may be arranged to measure the terminal voltage Eb of the battery 55 immediately after the shift to the battery mode so as to indirectly determine the remaining capacity Ca1 corresponding to the measured terminal voltage Eb on the basis of the remaining capacity map of FIG. 7.

Each of the during-discharge remaining-capacity measuring means 102 and during-charge remaining-capacity measuring means 104 may also be arranged to measure the terminal voltage Eb of the battery 55 during the discharge or recharge so as to indirectly determine the remaining capacity Ca1 corresponding to the measured terminal voltage Eb on the basis of the remaining capacity map of FIG. 7. However, because the temperature and remaining capacity influence relatively greatly when the electric motors 33L and 33R are operated in the battery mode, the during-discharge remaining-capacity measuring means 102 of FIG. 12B and the during-charge remaining-capacity measuring means 104 of FIG. 12C tend to achieve a higher measuring accuracy.

Further, the means 101, 102 and 104 for measuring the remaining capacity Ca1 of the battery 55 are not necessarily limited to the construction of obtaining the remaining capacity Ca1 by calculating the current discharge amount Ca2 or charge amount Ca3 from or the last remaining capacity Ca1. For instance, they may be constructed to constantly measure the remaining capacity Ca1 of the battery 55 irrespective of whether the machine 10 is in the battery mode or not.

Further, the arrangements for constantly measuring the discharge capacity or charging capacity irrespective of whether the machine 10 is in the battery mode or not and calculating the current remaining capacity Ca1 by subtracting the discharge capacity or adding the charging capacity from or to the remaining capacity Ca1 may also be included in the arrangements for constantly measuring the remaining capacity Ca1 via the means 101, 102 and 104.

Next, with reference to FIGS. 3 and 4 and a flow chart of FIGS. 13A-13E, a description will be given about a fourth embodiment of control performed by the control 56, which is arranged to avoid the over-discharge of the battery 55 when the snow removing machine 10 is driven to travel by only the power of the battery 55. Like the first embodiment, the fourth embodiment is initiated by the control 56 when the main switch 71 has been shifted from the "OFF" position to the "ON" position.

Figure 13A:
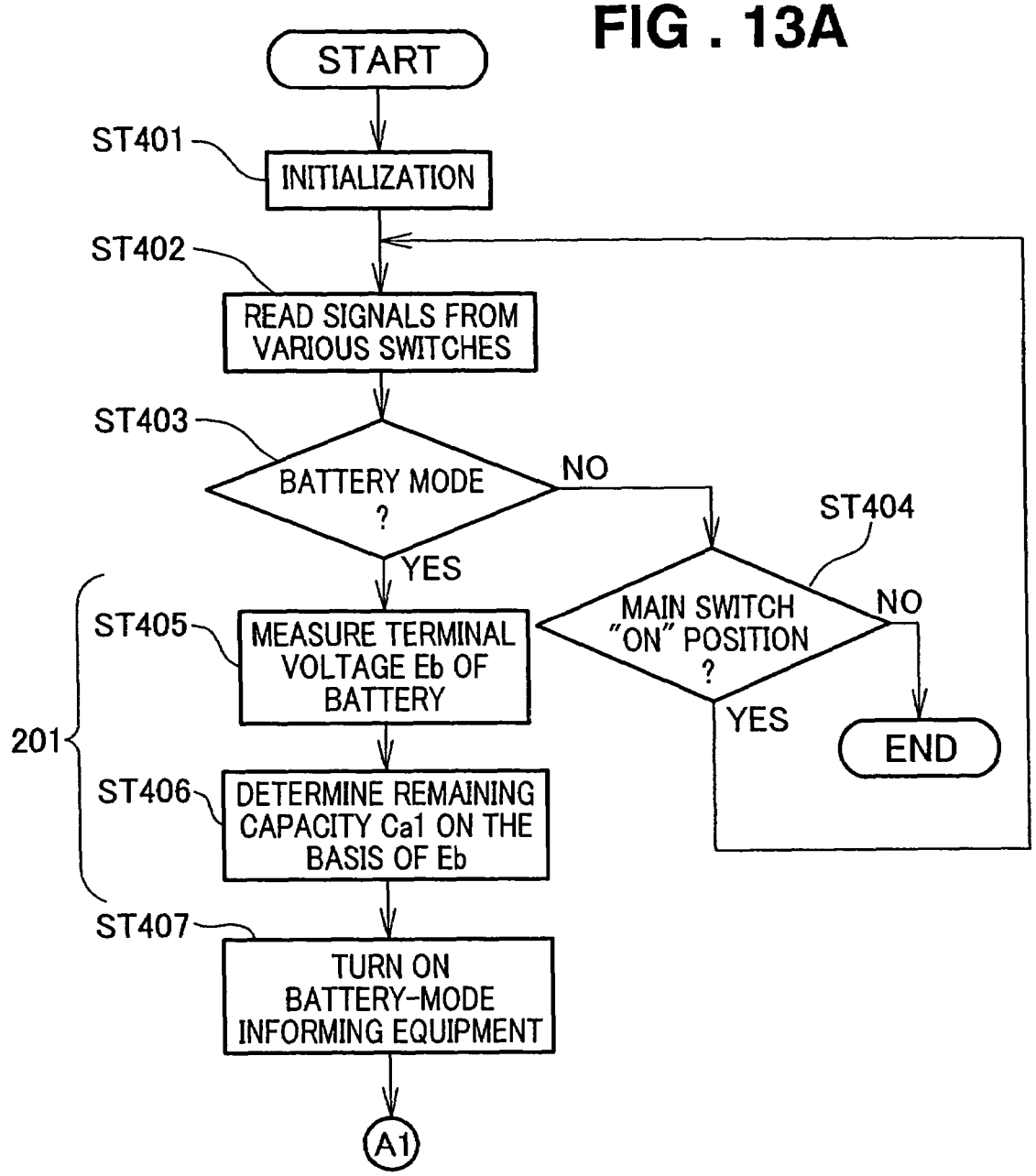

Step ST 401 of FIG. 13A: Necessary initialization process is performed.

Step ST402: Switch (and lever position) signals from the main switch 71, direction/speed lever 75, switch 77a of the travel preparation lever 77, left and right turning operation switches 81L and 81R, battery mode switch 83, etc. are read as input signals to the control unit 56.

Step ST403: It is determined whether the machine 10 is currently in the battery mode. With a negative (NO) determination, the control 56 proceeds to step ST404, while, with an affirmative (YES) determination, the control 56 goes to step ST405. Specifically, whether or not the machine 10 is in the battery mode is determined in any one of the two ways explained above in relation to the first embodiment.

Step ST404: A determination is made as to whether the main switch 71 is currently in the "ON" position. If answered in the affirmative, the control 56 reverts to step ST402, but if answered in the negative, the control unit 56 terminates the control flow. NO determination is made here if the main switch 71 has been shifted to the "OFF" position or "ST" (start) position without the machine 10 being shifted to the battery mode.

Step ST405: Terminal voltage Eb of the battery 55 immediately after the shift to the battery mode is measured; for this purpose, an actual terminal voltage of the battery 55 may be measured via the voltage sensor 96.

Step ST406: Remaining capacity Ca1 of the battery 55 immediately after the shift to the battery mode is measured on the basis of the terminal voltage Eb. Specifically, the remaining battery capacity Ca1 is determined from the battery remaining capacity map of FIG. 7 as in the above-described first embodiment.

Step ST407: The informing display 84 and informing sound generator 85 are turned on so as to inform the human operator that the machine 10 has been shifted to the battery mode, after which the control 56 moves on to step ST408 of FIG. 13B.

Figure 13B:
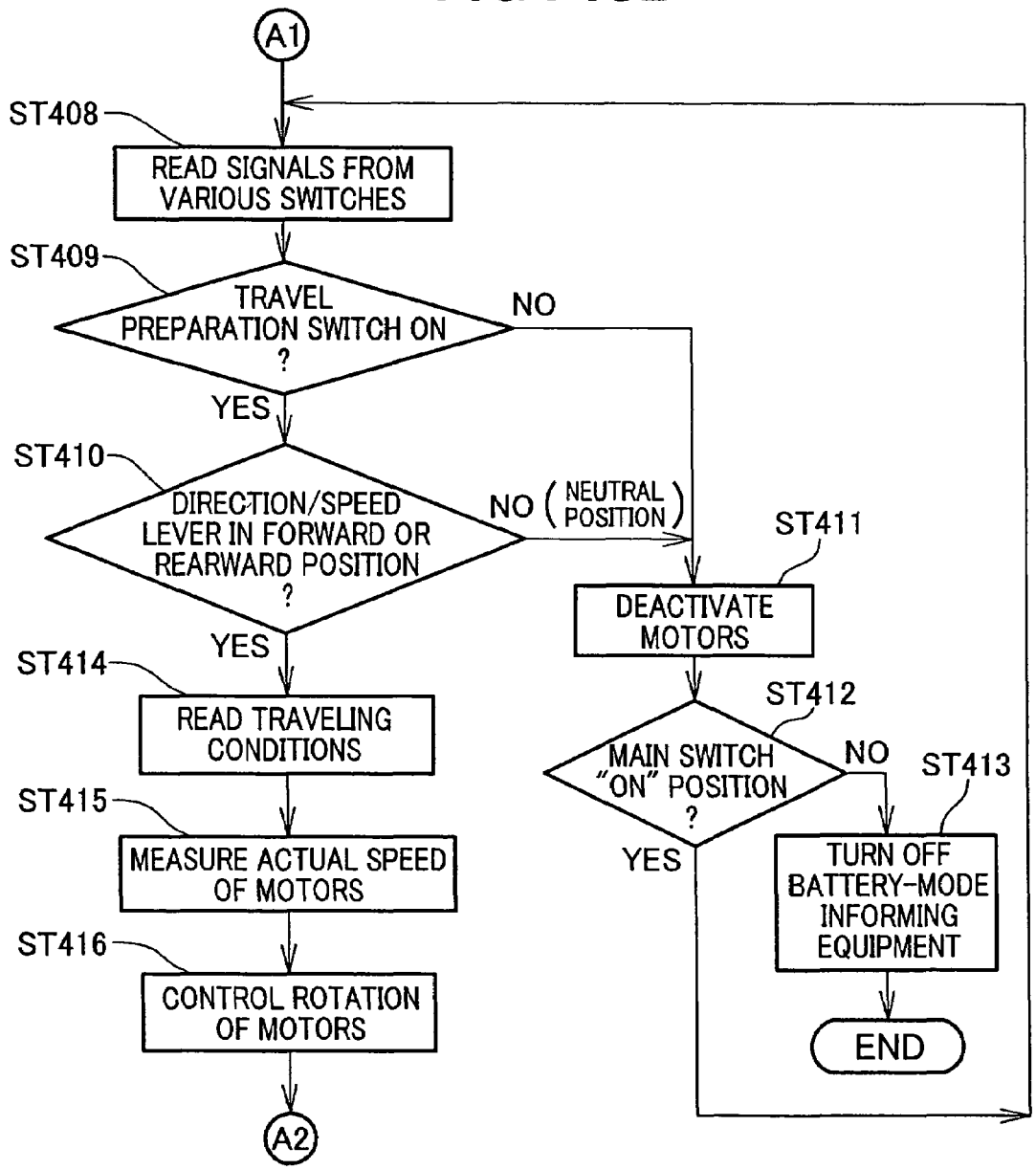

Step ST408 of FIG. 13B: Switch (and lever position) signals from the main switch 71, direction/speed lever 75, switch 77a of the travel preparation lever 77, left and right turning operation switches 81L and 81R, battery mode switch 83, etc. are read as input signals to the control 56.

Step ST409: It is further determined whether the switch 77a of the travel preparation lever 77 is currently ON. With a YES answer, the control 56 proceeds to step ST410, but, with a NO answer, the control 56 branches to step ST411. When the travel preparation lever 77 has been gripped by the human operator, a YES determination is made at this step.

Step ST410: A determination is made as to whether the direction/speed lever 75 is currently in the forward or rearward travel position. If answered in the negative, the control 56 branches to step ST411, but, if answered in the affirmative, the electric motors 33L and 33R are activated, and the control 56 goes to step ST414.

Step ST411: The motors 33L and 33R are deactivated upon satisfaction of the condition that the human operator has released or let go of the travel preparation lever 77 or has shifted the direction/speed lever 75 back to the neutral position (or range).

Step ST412: It is determined whether the main switch 71 is currently in the "ON" position. With a YES determination, the control 56 reverts to step ST408; otherwise, the control 56 branches to step ST413.

Step ST413: The control flow is brought to an end after the informing display 84 and informing sound generator 85 are turned off.

Step ST414: The control 56 reads current traveling conditions, such as the forward or rearward travel or turning movement, traveling speed, etc., of the snow removing machine 10. For example, target speeds of the left and right motors 33L and 33R are read from the current position of the direction/speed lever 75.

Step ST415: Actual rotating speeds of the left and right motors 33L and 33R are measured, for example, by measuring the respective numbers of rotations of the motors 33L and 33R via the rotation sensors 98L and 98R.

Step ST416: The rotation of the left and right motors 33L and 33R is controlled in accordance with predetermined control signals based on the traveling conditions and actual rotating speeds of the motors 33L and 33R, after which the control 56 moves on to step ST417. The predetermined control signals may be ones corresponding to PI outputs in the case where PI control is performed on the motors 33L and 33R or PID outputs in the case where PID control is performed on the motors 33L and 33R. Alternatively, the control signals may be pulse width modulation (PWM signals.

Step ST417 of FIG. 13C: The terminal voltage Eb of the battery 55 measured earlier is set as the last terminal voltage Ex.

Step ST418: Current terminal voltage Eb of the battery 55 is measured; for this purpose, an actual terminal voltage of the battery 55 may be measured via the voltage sensor 96.

Step ST419: The current terminal voltage Eb is compared with the last terminal voltage Ex. If the current terminal voltage Eb is lower than the last terminal voltage Ex, the control 56 goes to step ST420, judging that the battery 55 is currently discharging. If the current terminal voltage Eb is equal to the last terminal voltage Ex, the control 56 goes to step ST426 of FIG. 13D, judging that the battery 55 is not currently discharging or being charged. Further, if the current terminal voltage Eb is greater than the last terminal voltage Ex, the control 56 goes to step ST423, judging that the battery 55 is being charged.

Step ST420: Present discharge current A1 (consumed current A1) of the battery 55 is measured; for this purpose, an actual discharge current of the battery 55 may be measured via the current sensor 97.

Step ST421: Current discharge amount Ca2 of the battery 55 is calculated on the basis of the terminal voltage Eb and discharge current A1. Specifically, a ratio, to the capacity Pw of the fully-charged battery 55, of a product between the terminal voltage Eb and the discharge current A1 is calculated in terms of a percentage (%), and the thus-calculated ratio is set as the discharge amount Ca2; namely, Ca2=(Eb× A1/Pw)×100. The "capacity Pw of the fully-charged battery 55", which corresponds to the 100% remaining capacity of FIG. 7, is represented by V·A (Volt·Ampere).

Step ST422: Current remaining capacity Ca1 of the battery 55 is determined, and then the control 56 moves on to step ST426 of FIG. 13D. Specifically, a value calculated by subtracting the current charge amount Ca2 of the battery 55 from the last remaining amount Ca1 is set as a new current remaining amount Ca1 (i.e., Ca1=Ca1−Ca2).

Step ST423: Present charging current A2 (supplied current A2) to the battery 55 is measured; for this purpose, an actual charging current A2 to the battery 55 may be measured via the current sensor 97.

Step ST424: Current charge amount Ca3 of the battery 55 is calculated on the basis of the terminal voltage Eb and charging current A2. Specifically, a ratio, to the capacity Pw of the fully-charged battery 55, of a product between the terminal voltage Eb and charging current A2 is calculated in terms of a percentage (%), and the thus-calculated ratio is set as the charge amount Ca3, namely, Ca3=(Eb×A2/Pw)×100.

Step ST425: Current remaining capacity Ca1 of the battery 55 is determined, and then the control 56 goes to step ST426 of FIG. 13D. Specifically, a value calculated by adding the current charge amount Ca3 of the battery 55 to the last remaining amount Ca1 is set as a new current remaining amount Ca1 (i.e., Ca1=Ca1+Ca3).

Figure 13D:
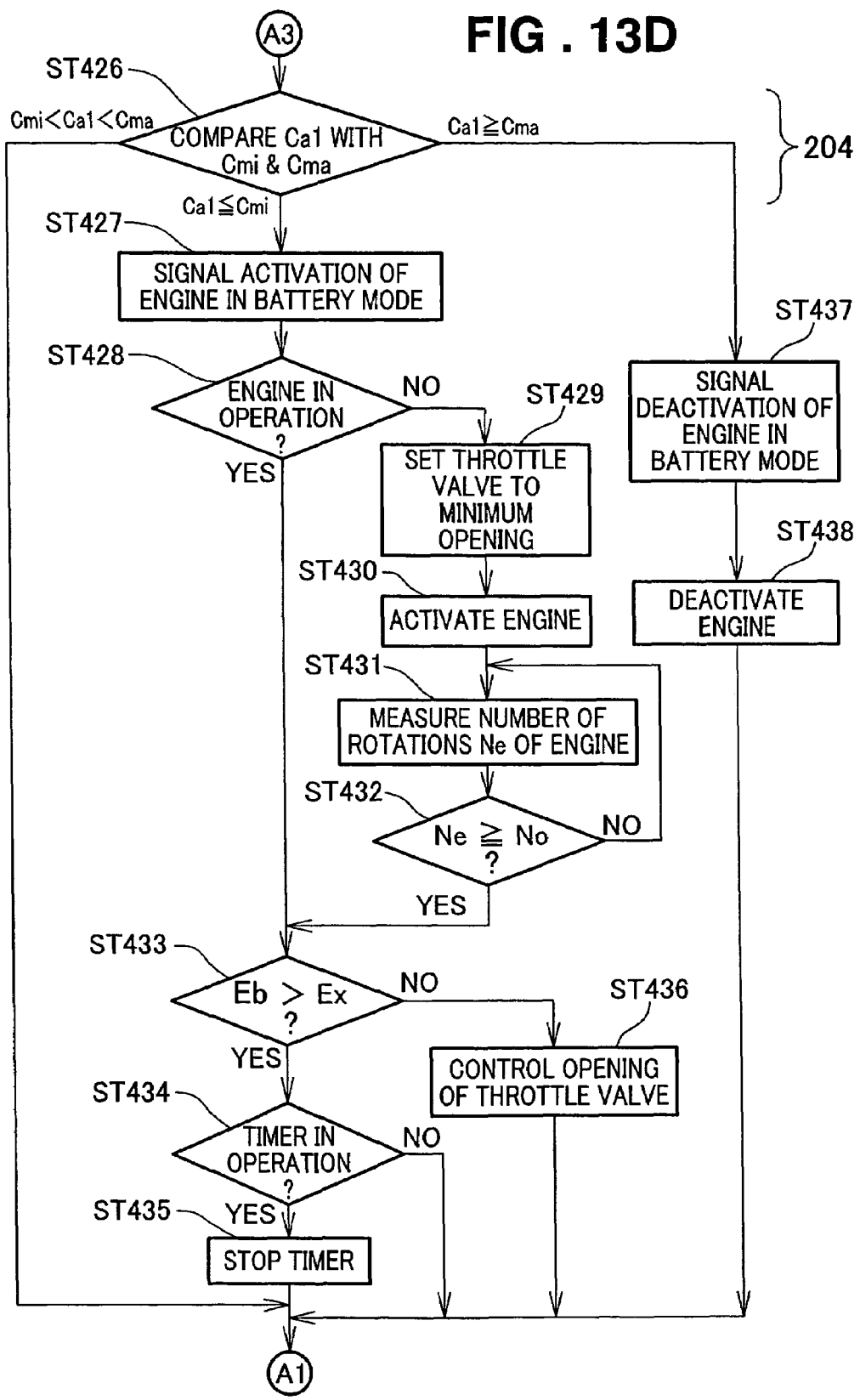

Step ST426 of FIG. 13D: The current remaining capacity Ca1 of the battery 55 is compared with preset lower and upper limit values Cmi and Cma of the battery 55 which are similar to the limit values Cmi and Cma explained above in relation to the third embodiment.

If the current remaining capacity Ca1 is greater than the lower limit value Cmi but smaller than the upper limit value Cma (Cmi<Ca1<Cma), then the control 506 reverts to step ST408 of FIG. 13B.

When the current remaining capacity Ca1 has decreased to the lower limit value Cmi due to the discharge of the battery 55 (Ca1≦Cmi), the control 506 goes to step ST427. On the other hand, when the current remaining capacity Ca1 has increased to the upper limit value Cma due to the charge to the battery 55 (Ca1≧Cma), the control 506 goes to step ST437.

Step ST427: Signal indicative of activation of the engine 34 in the battery mode is issued from the control 56 to the informing display 84 and informing sound generator 85, which in turn inform the human operator that the engine 34 has been activated in the battery mode.

Step ST428: A determination is made as to whether the engine 34 is currently in operation. With a NO determination, the control 56 goes to step ST429, while, with a YES determination, the control 56 goes to step ST433.

Step ST429: Because the engine 34 is currently at rest, the control 56 issues a control signal to the valve drive section 94A so that the opening of the throttle valve 94 operating the engine 34 is set at a minimum level; namely, the valve drive section 94A drives the throttle valve 94 in such a manner that the valve 94 assumes the minimum opening intended for idling operation of the engine 34.

Step ST430: The engine 34 is activated to rotate with a minimum number of rotations intended for idling operation.

Step ST431: The number of rotations (rotating speed) Ne of the engine 34 is measured; for this purpose, an actual number of rotations of the engine 34 may be measured by the rotation sensor 99.

Step ST432: A determination is made as to whether the number of rotations Ne of the engine 34 has increased to a preset reference number of rotations (or reference rotating speed) No. With a YES determination, the control 56 goes to step ST433, but, with a NO determination, the control 56 reverts to step ST431. The "reference number of rotations" No represents a particular number of rotations to be used as a threshold or criterion for ascertaining whether the engine 34 activated to rotate with the minimum number of rotations intended for idling operation has reached a stable operating state. The operations of steps ST431 and 432 are repeated until the engine 34 arrives at the stable operating state.

Step ST433: It is further determined whether the current terminal voltage Eb of the battery 55 has exceeded the last terminal voltage Ex during operation of the engine 34. With a YES determination, the control 56 goes to step ST434, but, with a NO determination, the control 56 goes to step ST436.

If the current terminal voltage Eb of the battery 55 has exceeded the last terminal voltage Ex as determined at step ST433, it means that the charge amount of the battery 55 is greater than the discharge amount. If the current terminal voltage Eb of the battery 55 is equal to the last terminal voltage Ex, it means that a good balance is present between the charge amount and the discharge amount. Further, if the current terminal voltage Eb of the battery 55 is lower than the last terminal voltage Ex, then it means that the charge amount is smaller than the discharge amount.

Step ST434: A determination is made as to whether a timer to be later described (see step ST502 of FIG. 13E) is currently in operation. With a YES determination, the control 56 goes to step ST435, while, with a NO determination, the control 56 reverts to step ST408 of FIG. 13B.

Step ST435: The timer is deactivated, and then the control 56 reverts to step ST408 of FIG. 13B.

Step ST436: The opening of the throttle valve 94 is increased to increase the number of rotations of the engine 34 so that the current terminal voltage Eb of the battery 55 exceeds the last terminal voltage Ex, and then the control 56 reverts to step ST408 of FIG. 13B. Specific valve opening control sequence will be described later in relation to a subroutine of FIG. 13E.

Step ST437: Once the remaining capacity Ca1 reaches the upper limit Cma, a signal indicative of deactivation of the engine 34 in the battery mode is issued from the control unit 56 to the informing display 84 and informing sound generator 85 so as to inform the human operator that the engine 34 has been deactivated in the battery mode.

Step ST438: After the deactivation of the engine 34, the control unit 56 reverts to step ST408 of FIG. 13B.

Figure 13E:
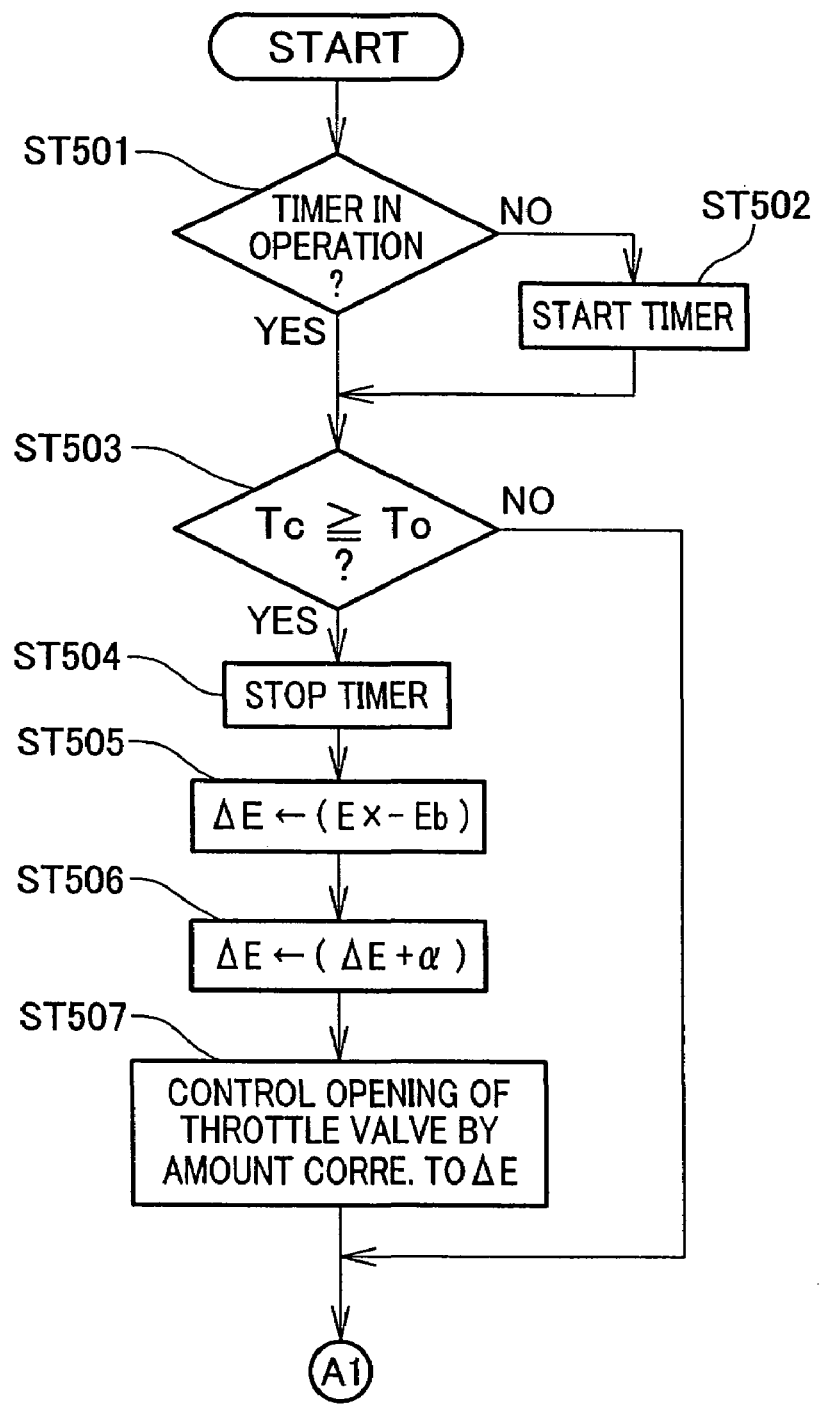
Figure 14:
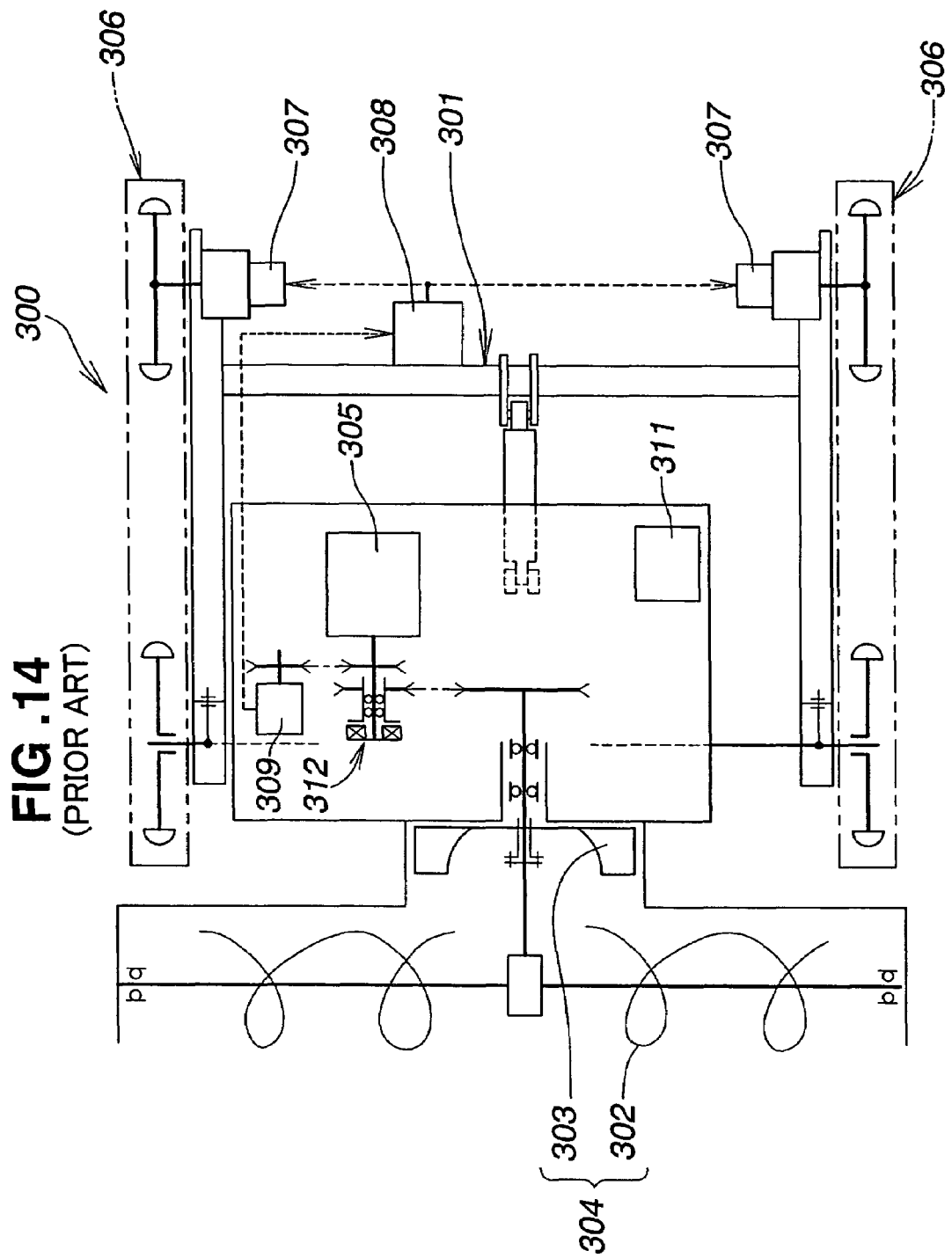
FIG. 14 is a view schematically showing a conventional working machine.

FIG. 13E shows the subroutine for controlling the opening of the throttle valve 94 at step ST436 of FIG. 13D.

Step ST501: A determination is made as to whether the timer is currently in operation. With a NO determination, the control 56 goes to step ST502, while, with a YES determination, the control 56 goes to step ST503.

Step ST502: Because the current terminal voltage Eb of the battery 55 has not exceeded the last terminal voltage Ex, the timer is started with its time count Tc reset to zero.

Step ST503: It is ascertained whether the time Tc counted by the timer has reached a preset reference time To. With a YES answer, the control 56 goes to step ST504, while, with a NO answer, the control 56 reverts to step ST408 of FIG. 13B.

Step ST504: The timer is deactivated. Namely, at steps ST501-ST504, a determination is made as to whether the state where the current terminal voltage Eb of the battery 55 is lower than the last terminal voltage Ex has lasted for the preset reference time To.

Step ST505: Now that the state where the current terminal voltage Eb of the battery 55 is lower than the last terminal voltage Ex has lasted for the preset reference time To, a value calculated by subtracting the current terminal voltage Eb from the last terminal voltage Ex is set as a voltage difference $\Delta E$ (i.e., $\Delta E = Ex - Eb$).

Step ST506: Value calculated by adding a preset correction value a to the voltage difference $\Delta E$ is set as a new voltage difference $\Delta E$ (i.e., $\Delta E = \Delta E + \alpha$). The correction value $\alpha$ is a value for allowing the current terminal voltage Eb to gradually increase so as to exceed the last terminal voltage Ex, as noted below.

Step ST507: The opening of the throttle valve 94 is increased by an amount corresponding to the new voltage difference $\Delta E$ and an opening increase control signal is issued to the valve drive section 94A, after which the control 56 reverts to step ST408 of FIG. 13B. As a consequence, the valve drive section 94A drives the throttle valve 94 in such a manner that the valve opening increases gradually by the amount corresponding to the new voltage difference $\Delta E$. The control signal may be one corresponding to a PI output in the case where PI control is performed on the motors 33L and 33R or PID output in the case where PID control is performed on the motors 33L and 33R. Alternatively, the control signal may be a pulse width modulation (PWM) signal.

The number of rotations Ne of the engine 34 increases as the opening of the throttle valve 94 is increased. Consequently, the generated electric power of the generator 54 driven by the output of the engine 34 increases, so that the power (charge amount) supplied to the battery 208 also increases. Thus, the current terminal voltage Eb will increase and exceed the last terminal voltage Ex. In this way, the amount of the charge to the battery 55 exceeds the amount of the discharge from the battery 55, as a result of which the battery 55 can be charged efficiently even though the motors 33L and 33R are in operation.

As may be apparent from the forgoing, the following steps in the control sequence of FIGS. 13A, 13C and 13D constitute the following means.

(1) Steps ST405 and ST406 shown in FIG. 13A together constitute an "initial remaining-capacity measuring means 201" for measuring the remaining capacity Ca1 of the battery 55 immediately after the shift to the battery mode, as in the third embodiment.

(2) Steps ST418, ST420, ST421 and ST422 shown in FIG. 13C together constitute a "during-discharge remaining-capacity measuring means 202" for constantly measuring the remaining capacity Ca1 of the battery 55 during the discharge of the battery 55, as in the third embodiment.

(3) Steps ST418, ST423, ST424 and ST425 shown in FIG. 13C together constitute a "during-charge remaining-capacity measuring means 203" for constantly measuring the remaining capacity Ca1 of the battery 55 during the charge of the battery 55, as in the third embodiment.

(4) The above-mentioned initial remaining-capacity measuring means 201, during-discharge remaining-capacity measuring means 202 and during-charge remaining-capacity measuring means 203 together constitute "remaining capacity measuring means".

(5) Step ST426 shown in FIG. 13D constitutes a "lower/upper remaining capacity limit judging means 204" for judging whether the remaining capacity Ca1 of the battery 55 has decreased to the lower limit value (lower discharge limit) Cmi and judging whether the remaining capacity Ca1 of the battery 55 has increased to the upper limit value (upper charge limit) Cma. Namely, the lower/upper remaining capacity limit judging means 204 functions as both a lower remaining capacity limit judging means and an upper remaining capacity limit judging means.

Namely, the lower remaining capacity limit judging means presets the lower limit value Cmi of the remaining capacity of the battery 55 and judges whether the remaining capacity Ca1 of the battery 55 has decreased to the lower limit value Cmi. The upper remaining capacity limit judging means, on the other hand, presets the upper limit value Cmi of the remaining capacity of the battery 55 and judges whether the remaining capacity Ca1 of the battery 55 has increased to the upper limit value Cmi.

As set forth above, the fourth embodiment is arranged to: preset the lower limit value Cmi of the remaining capacity that represents a minimum remaining capacity necessary to activate the engine 34 at least once during execution of the battery mode; constantly measure the remaining capacity Ca1 of the battery 55 during execution of the battery mode; and activate the engine 34 when the remaining capacity Ca1 has decreased to the lower limit value Cmi, to thereby drive the power generator 54 to charge the battery 55. Namely, when the remaining capacity Ca1 has decreased to the lower limit value Cmi in the battery mode, the control unit 56 automatically activates the engine 34 to charge the battery 55 via the power generator 54. Thus, even after the remaining capacity Ca1 has decreased to the lower limit value Cmi, the control unit 56 permits continued operation of the motors 33L and 33R and yet can prevent the over-discharge of the battery 55.

Therefore, no cumbersome operation by the human operator is required even when the remaining capacity Ca1 has decreased to the lower limit value Cmi; for example, there is required no operation for "activating the engine 34 after temporary deactivation of the motors 33L and 33R and then re-activating the motors 33L and 33R". Thus, the controllability and handling ease of the machine 10 in the battery mode can be even further enhanced.

Further, the fourth embodiment is also arranged to: constantly measure the remaining capacity Ca1 of the battery 55 when the engine 34 is driving the power generator 54 to charge the battery 55 in the battery mode; and deactivate the engine 34 upon satisfaction of the condition that the remaining capacity Ca1 has increased to the preset upper limit Cma.

Furthermore, when the engine 34 is driving the power generator 54 to charge the battery 55 in the battery mode, the fourth embodiment constantly controls the opening of the throttle valve 94 in accordance with the constantly-measured remaining capacity Ca1 of the battery 55. Since the amount of fuel supply to the engine 34 is controlled in accordance with the opening of the throttle valve 94, the number of rotations Ne of the engine 94 can be adjusted appropriately, as a result of which the engine 34 can constantly operate under optimal conditions in response to a charged state of the battery 55. For example, by operating the engine 34 in such a manner that the amount of the charge (power supply) from the power generator 54 to the battery 55 constantly exceeds the amount of the discharge (power consumption) form the battery 55 to the motors 33L and 33R irrespective of operating conditions (such as intensity of loads), the battery 55 can be charged efficiently.

Further, when the remaining capacity Ca1 of the battery 55 has increased to the upper limit value Cma during the charge to the battery 55 in the battery mode, the charge to the battery 55 is terminated by the control unit 56 automatically deactivating the engine 34. Namely, during execution of the battery mode, the engine 34 is automatically caused to operate temporarily for a short time.

The motors 33L and 33R are allowed to operate continuously for a relatively long time irrespective of the remaining capacity Ca1 of the battery 55, while the engine 34 is caused to operate in an intermittent manner. Therefore, the controllability and handling ease of the machine 10 in the battery mode can be even further enhanced.

The remaining capacity Ca1 of the battery 55 may be measured either directly or indirectly. For example, the initial remaining-capacity measuring means 201 may be arranged to measure the terminal voltage Eb of the battery 55 immediately after the shift to the battery mode so as to indirectly determine the remaining capacity Ca1 corresponding to the measured terminal voltage Eb on the basis of the remaining capacity map of FIG. 7.

Each of the during-discharge remaining-capacity measuring means 202 and during-charge remaining-capacity measuring means 203 may also be arranged to measure the terminal voltage Eb of the battery 55 during the discharge or recharge so as to indirectly determine the remaining capacity Ca1 corresponding to the measured terminal voltage Eb on the basis of the remaining capacity map of FIG. 7, similarly to the initial remaining-capacity measuring means 201. However, because the temperature and remaining capacity influence relatively greatly when the electric motors 33L and 33R are being operated in the battery mode, the during-discharge remaining-capacity measuring means 202 and during-charge remaining-capacity measuring means 203 of FIG. 13C tend to achieve a higher measuring accuracy.

Further, in the fourth embodiment, the means 201, 202 and 203 for measuring the remaining capacity Ca1 of the battery 55 are not necessarily limited to the construction of obtaining the remaining capacity Ca1 by calculating the current discharge amount Ca2 or charge amount Ca3 of the battery 55 on the basis of the terminal voltage Eb and discharge current A1 or charging current A2 and then subtracting or adding the discharge amount discharge Ca2 or charge amount Ca3 from or to the last remaining capacity Ca1. For instance, they may be constructed to constantly measure the remaining capacity Ca1 of the battery 55 irrespective of whether the machine 10 is in the battery mode or not.

Further, in the fourth embodiment, the arrangements for constantly measuring the discharge capacity and charging capacity irrespective of whether the machine 10 is in the battery mode or not and calculating the current remaining capacity Ca1 by subtracting the discharge capacity and adding the charging capacity from and to the remaining capacity Ca1 may also be implemented by the arrangements for constantly measuring the remaining capacity Ca1 via the means 201, 202 and 203.

The first to fourth embodiments have been described above in relation to the case where the working machine of the present invention is embodied as a snow removing machine. However, the present invention is not so limited and may be embodied as other types of working machines, such as earth cultivating machines.

Further, the traveling units 20L and 20R may be other than crawlers, such as traveling wheels. As the internal combustion engine 34, there may be employed a gasoline engine or diesel engine.

Furthermore, as the means for shifting the inventive machine to the battery mode, there may be employed either one of the battery mode switch 83 and the left and right turning operation switches 81L and 81R.

Moreover, the left and right turning operation switches 81L and 81R are not limited to push buttons; for example, these switches 81L and 81R may be left and right lever switches operable via levers provided on the left and right operating handles 51L and 51R. In such a case, the left and right lever switches may be constructed to function also as the means for shifting the inventive machine to the battery mode.

Obviously, various minor changes and modifications of the present invention are possible in the light of the above teaching. It is therefore to be understood that within the scope of the appended claims the invention may be practiced otherwise than as specifically described.

What is claimed is:

1. A working machine comprising:
a machine body;
a working unit attached to the machine body;
an internal combustion engine for driving the working unit;
a traveling unit mounted on the machine body for displacing the working unit over a ground surface to perform a work operation on the ground surface;
an electric motor for driving the traveling unit;
a battery for supplying electric power to the electric motor in a battery mode of the working machine to thereby drive the electric motor;
a battery mode switch for switching between an ON position in which the working machine is in the battery mode and an OFF position in which the working machine is not in the battery mode;
a power generator driven by the internal combustion engine to supply electric power to the battery and to the electric motor; and
a control unit that controls rotation of the electric motor and that shifts the working machine to the battery mode in accordance with an ON position of the battery mode switch so that the electric motor is driven only by electric power supplied by the battery while the internal combustion engine is maintained deactivated.

2. A working machine comprising:
a machine body;
a working unit attached to the machine body;
an internal combustion engine for driving the working unit;
a traveling unit mounted on the machine body for displacing the working unit over a ground surface to perform a work operation on the ground surface;
an electric motor for driving the traveling unit;
a battery for supplying electric power to the electric motor in a battery mode of the working machine to thereby drive the electric motor;
a power generator driven by the internal combustion engine to supply electric power to the battery and to the electric motor; and
a control unit that controls rotation of the electric motor, that shifts the working machine to the battery mode so that the electric motor is driven only by electric power supplied by the battery while the internal combustion engine is maintained deactivated, that measures a terminal voltage of the battery immediately after a shift to the battery mode, that determines a remaining capacity of the battery in accordance with the measured terminal voltage, that determines a travel-permitting capacity of the battery by subtracting, from the remaining capacity, a minimum remaining capacity of the battery necessary to activate the internal combustion engine at least once, that determines a maximum available travel time in accordance with the travel-permitting capacity, and that performs control to allow the electric motor to be rotated for the maximum available travel time.

3. A working machine comprising:
a machine body;
a working unit attached to the machine body;
an internal combustion engine for driving the working unit;
a traveling unit mounted on the machine body for displacing the working unit over a ground surface to perform a work operation on the ground surface;
an electric motor for driving the traveling unit;
a battery for supplying electric power to the electric motor in a battery mode of the working machine to thereby drive the electric motor;
a power generator driven by the internal combustion engine to supply electric power to the battery and to the electric motor; and
a control unit that controls rotation of the electric motor, that shifts the working machine to the battery mode so that the electric motor is driven only by electric power supplied by the battery while the internal combustion engine is maintained deactivated, that sets target acceleration and target maximum traveling speed of the traveling unit to be applied when the electric motor is rotated by only the electric power supplied by the battery with the internal combustion engine kept deactivated, to respective given values smaller than values of the target acceleration and target maximum traveling speed of the traveling unit to be applied when the internal combustion engine is driven to rotate the electric motor, and that controls, in accordance with the smaller values, the rotation of the electric motor rotated by only the electric power supplied by the battery with the internal combustion engine kept deactivated.

4. A working machine comprising:
a machine body;
a working unit attached to the machine body;

an internal combustion engine for driving the working unit;

a traveling unit mounted on the machine body for displacing the working unit over a ground surface to perform a work operation on the ground surface;

an electric motor for driving the traveling unit;

a battery for supplying electric power to the electric motor in a battery mode of the working machine to thereby drive the electric motor;

a power generator driven by the internal combustion engine to supply electric power to the battery and to the electric motor; and a control unit that controls rotation of the electric motor, that shifts the working machine to the battery mode so that the electric motor is driven only by electric power supplied by the battery while the internal combustion engine is maintained deactivated, that presets a lower limit of a remaining capacity of the battery necessary to activate the internal combustion engine at least once, that constantly measures the remaining capacity of the battery in the battery mode, and that performs control to deactivate the electric motor and issue, to informing equipment, a signal requesting activation of the internal combustion engine when the measured remaining capacity has decreased to the lower limit during the battery mode.

5. A working machine as claimed in claim 4; wherein, in the battery mode, the control unit constantly measures the remaining capacity of the battery while the internal combustion engine is driving the power generator to charge the battery; and wherein when the measured remaining capacity has increased to a preset upper limit during the battery mode, the control unit performs control to issue, to the informing equipment, a signal requesting deactivation of the internal combustion engine.

6. A working machine comprising:

a machine body;

a working unit attached to the machine body;

an internal combustion engine for driving the working unit;

a traveling unit mounted on the machine body for displacing the working unit over a ground surface to perform a work operation on the ground surface;

an electric motor for driving the traveling unit;

a battery for supplying electric power to the electric motor in a battery mode of the working machine to thereby drive the electric motor;

a power generator driven by the internal combustion engine to supply electric power to the battery and to the electric motor; and a control unit that controls rotation of the electric motor, that shifts the working machine to the battery mode so that the electric motor is driven only by electric power supplied by the battery while the internal combustion engine is maintained deactivated, that presets a lower limit of a remaining capacity of the battery necessary to activate the internal combustion engine at least once, that constantly measures the remaining capacity of the battery in the battery mode, and that performs control to activate the internal combustion engine to thereby drive the power generator so that the battery is charged by the electric power generated by the power generator when the measured remaining capacity has decreased to the lower limit during the battery mode.

7. A working machine as claimed in claim 6; wherein in the battery mode, the control unit constantly measures the remaining capacity of the battery and controls opening of a throttle valve to adjust a number of rotations of the internal combustion engine in accordance with the measured remaining capacity while the internal combustion engine is driving the power generator to charge the battery; and wherein when the measured remaining capacity has increased to a preset upper limit during the battery mode, the control unit performs control to deactivate the internal combustion engine.

8. A working machine according to claim 1; wherein a target deceleration of the traveling unit in a non-battery mode of the working machine is equal to or greater than a target acceleration of the traveling unit in the non-battery mode of the working machine; and wherein a target deceleration for the traveling unit in a battery mode of the working machine is substantially equal to that of the target deceleration for the non-battery mode.

9. A working machine according to claim 1; wherein a target traveling speed of the traveling unit in the battery mode of the working machine is lower than a target traveling speed of the traveling unit in a non-battery mode of the working machine.

10. A working machine according to claim 1; further comprising remaining-capacity measuring means for measuring a remaining capacity of the battery immediately after the control unit shifts the working machine to the battery mode, constantly measuring the remaining capacity of the battery during discharge of the battery, and constantly measuring the remaining capacity of the battery during charge of the battery.

11. A working machine according to claim 10; further comprising lower remaining capacity judging means for presetting a lower limit value of the remaining capacity of the battery and judging whether the remaining capacity of the battery has decreased to the lower limit value; and upper remaining capacity limit judging means for presetting an upper limit value of the remaining of the battery and judging whether the remaining capacity of the battery has increased to the upper limit value.

12. A working machine according to claim 11; further comprising means for generating a signal requesting activation of the internal combustion engine when the lower remaining capacity judging means judges that the remaining capacity of the battery has decreased to the lower limit value.

13. A working machine according to claim 11; further comprising means measuring the remaining capacity of the battery irrespective of whether the working machine is in the battery mode or not.

14. A working machine according to claim 10; further comprising judging means for judging whether the remaining capacity of the battery has decreased to a lower limit value and for judging whether the remaining capacity of the battery has increased to an upper limit value.

15. A working machine according to claim 14; further comprising means measuring the remaining capacity of the battery irrespective of whether the working machine is in the battery mode or not.

16. A working machine according to claim 2; wherein as a result of the measurement of the terminal voltage of the battery, the determination of the remaining capacity of the battery, the determination of the travel-permitting capacity of the battery, and the determination of the maximum available travel time by the control unit, the minimum remaining capacity of the battery necessary to activate the internal combustion engine is left unconsumed.

* * * * *